US009094396B2

(12) United States Patent
Soni et al.

(10) Patent No.: US 9,094,396 B2
(45) Date of Patent: Jul. 28, 2015

(54) INTEGRATED PROFILE CREATION FOR A SOCIAL NETWORK ENVIRONMENT

(71) Applicant: MATCH.COM, L.L.C., Dallas, TX (US)

(72) Inventors: Bhavesh Soni, Irving, TX (US); Sushil Sharma, Plano, TX (US)

(73) Assignee: MATCH.COM, L.L.C., Dallas, TX (US)

( * ) Notice: Subject to any disclaimer, the term of this patent is extended or adjusted under 35 U.S.C. 154(b) by 29 days.

(21) Appl. No.: 14/088,151

(22) Filed: Nov. 22, 2013

(65) Prior Publication Data

US 2015/0150100 A1    May 28, 2015

(51) Int. Cl.
*H04L 29/06*    (2006.01)

(52) U.S. Cl.
CPC .................................. *H04L 63/0876* (2013.01)

(58) Field of Classification Search
CPC .................................................. H04L 63/0876
USPC ............................................................. 726/7
See application file for complete search history.

(56) References Cited

U.S. PATENT DOCUMENTS

| | | | | |
|---|---|---|---|---|
| 6,405,197 | B2* | 6/2002 | Gilmour ....................... | 707/805 |
| 6,975,855 | B1* | 12/2005 | Wallenius .................... | 455/417 |
| 2003/0084171 | A1* | 5/2003 | de Jong et al. ............... | 709/229 |
| 2005/0239447 | A1* | 10/2005 | Holzman et al. ............ | 455/414.3 |
| 2007/0077920 | A1* | 4/2007 | Weeks et al. ................ | 455/414.1 |
| 2007/0261116 | A1* | 11/2007 | Prafullchandra et al. ....... | 726/22 |
| 2008/0021288 | A1* | 1/2008 | Bowman et al. .............. | 600/300 |
| 2009/0306959 | A1* | 12/2009 | Rappoport et al. ............... | 704/2 |
| 2009/0322597 | A1 | 12/2009 | Medina Herrero et al. | |
| 2010/0246576 | A1 | 9/2010 | Bustamente | |
| 2010/0283827 | A1 | 11/2010 | Bustamente | |
| 2010/0285856 | A1 | 11/2010 | Thomas | |
| 2010/0287286 | A1 | 11/2010 | Bustamente | |
| 2011/0313647 | A1 | 12/2011 | Koebler et al. | |
| 2012/0227086 | A1* | 9/2012 | Dale et al. ......................... | 726/3 |

OTHER PUBLICATIONS

Offringa, Peter "Zoosk—The Engineering behind Real Time Communications," available online at <URL http://highscalability.com/blog/2012/8/27/zoosk-the-engineering-behind-real-time-communications.html>, Aug. 27, 2012 (4 pages).
Zoosk Customer Support, "How Do I Video Chat?" available online at URL https://zoosk.zendesk.com/entries/20513017-how-do-i-video-chat> Oct. 7, 2011 (3 pages).

* cited by examiner

*Primary Examiner* — Michael S McNally

(57) ABSTRACT

In an example, a system and method is disclosed for providing a user matching system. To ease creation of a profile, a node may be enabled to connect to a third-party social media site where the node already has an established profile. The established profile is imported, wherein common fields are directly mapped, inferred fields may be deterministically inferred, and other fields such as "likes" may be assigned relative weights based on recentness, subjective user rankings, or correlation to other "likes." The node may also be enabled to permanently log in to the matching system via credentials for the third-party social media site.

21 Claims, 26 Drawing Sheets

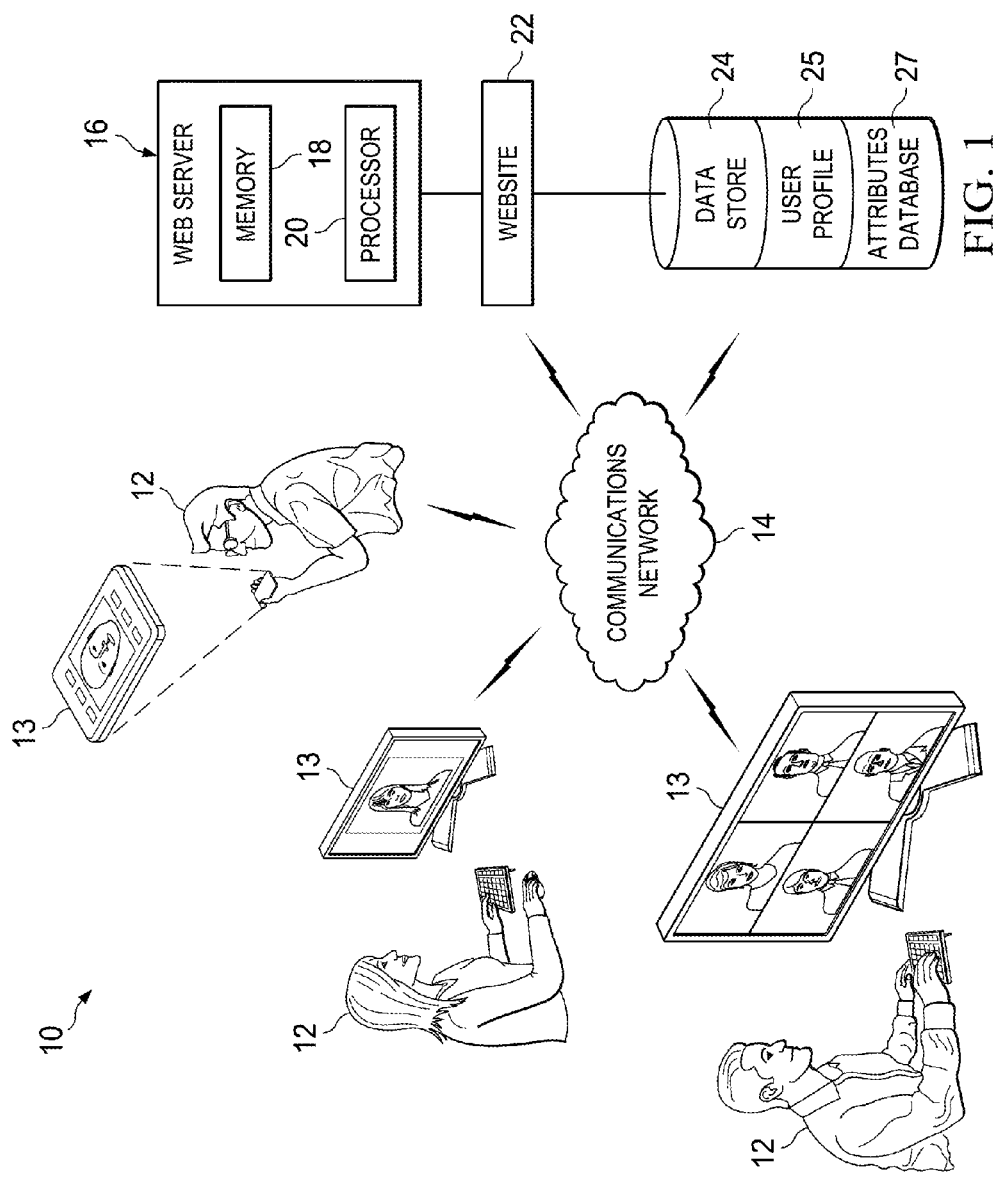

FIG. 2C

FIG. 2D match.com  My Match | Search | My Profile | Email | Advice:

Sign In ☐ Account Settings ☐ How Match Works ☐ Help ☐

Click here to subscribe to Match.com today!

Sign up to see her profile.

Ready to learn more about who LadyDi520 is and who she is looking for? Sign up for free below!

LadyDi520
32-year old
Dallas TX, US
Active within 24 hours

Choose a username: [ ]
Choose a password: [ ]
Your email address: [ ]
I am a: ○ Man  ○ Woman
Seeking: ○ Man  ○ Woman
Between ages: [25 ▼] and [33 ▼]
Your birthday: [Month ▼] [Day ▼] [Year ▼]
Your country: [United States ▼]
Zip / postal code: [ ]
Where did you hear about Match.com: [Choose below ▼] (Optional)

[✓] Send me photos of my compatible matches. By checking this box, I also consent to receive from Match.com special offers and promotions relating to Match.com and select third parties, as well as tips and announcements on how I can better use the Match.com service.

[ ] Send me special offers and partner promotions. Receive exclusive deals and timely updates sent to you by select Match.com partners.

I am at least 18 years old and have read and agree to Match.com's terms of use and privacy policy.

match.com                                          close window

LadyDi520
Active within 24 hours    New
Basics
"Looking for my Knight in Shining Armor"
| | |
|---|---|
| I am a: | 32 yr old woman |
| located in: | Dallas, Texas, United States |
| looking for: | Dating: 32 to 45-year old man within 25 miles of Dallas metroplex, Dallas, Texas, United States |
| relationships: | Currently separated |
| my ethnicity: | White / Caucasian |
| body type: | Slender |
| height: | 5' 4" (162.6 cms) |
| sense of humor: | Clever: Nothing's better than a quick-witted comeback, Friendly: I'll laugh at anything |
| sign: | Cancer |

About me and who I'd like to meet
I am a good person that is very caring, I have been married for almost 6 years and we are getting divorced. (I wanted it so don't say sorry LOL) I am just looking for someone that can make me smile, laugh, and enjoy life again it is too short to stay in something that has nothing left. I hope my knight in shining armor is out there somewhere!!!!!!

Appearance
| | |
|---|---|
| height: | 5' 4" (162.6 cms) |
| eyes: | Green |
| hair: | Auburn / Red |
| body type: | Slender |
| body art: | Belly button ring |
| best feature: | Chest |

Interests
for fun:
I love to have a good time at whatever I am doing. I love to laugh I love to smile and I am looking for that someone that can make that happen, it hasn't for a LONG time.

FROM FIG. 2H favorite hot spots:
    I love Olive Garden (cheap date) LOL then karaoke, pool, things like that I am more into smaller bars then the big ones favorite things:
    I love shows like CSI, Las Vegas, Court TV, I love to read true crime novels and SPORTS Ohio State Football is #1 then Nascar I love JR and Stewart last read:
    A book by Ann Rule

| | |
|---|---|
| sense of humor: | Clever: Nothing's better than a quick-witted comeback, Friendly: I'll laugh at anything |
| sports and exercise: | No Answer |
| common interests: | Cooking, Dining out, Movies/Videos, Music and concerts, Watching sports |

Lifestyle

| | |
|---|---|
| exercise habits: | Don't exercise |
| daily diet: | Meat and potatoes |
| smoke: | Daily |
| drink: | Social drinker, maybe one or two |
| job: | Other profession |

I am a bartender right now, I used to be a medical secretary but got tired of the 9-5 taking a break

| | |
|---|---|
| income: | $25,001 to $35,000 |
| my place: | Live with pets |
| have kids: | Yes, and they live away from home |
| how many: | 3 |
| want kids: | No Answer | pets:

| | |
|---|---|
| I have: | Dogs, Fish |
| I don't have, but like: | Cats |
| I don't like: | Reptiles, Birds, Exotic pets, Gerbils / Guinea Pigs / Etc., Fleas, Other |

Background / Values

| | |
|---|---|
| ethnicity: | White / Caucasian |
| faith: | Christian / Other |
| education: | Some college |

Ohio State for 2 years

FROM FIG. 2I

| | |
|---|---|
| languages: | English |
| politics: | Conservative |
| About My Date | |
| hair: | Light brown, Dark brown, Blonde, Bald |
| eyes: | Blue, Green |
| height: | 5' 8" (172.7 cms) to 6' 8" (203.2 cms) |
| body type: | About average, Athletic and toned |
| languages: | English |
| ethnicity: | White / Caucasian |
| faith: | Christian / Other |
| education: | Any |
| job: | Political / Govt / Civil Service / Military |
| income: | Any |
| smoke: | Any |
| drink: | Social drinker, maybe one or two, regularly |
| relationships: | Committed relationships but never married, Widowed, Currently separated, Divorced, Several committed relationships - but now single |
| have kids: | Any |
| want kids: | Don't want to have kids |
| turn-ons: | Skinny dipping, Flirting, Thrills, Public displays of affection, Dancing, Power, Boldness / Assertiveness, Erotica, Candlelight |
| turn-offs: | Body piercings, Long hair, Sarcasm, Brainiacs, Thunderstorms |
| perfect date: | |
| | Fun<br>Boot scootin' across gritty floorboards, the band playing what we'll soon remember as "our song" |
| Photos | |

INTEGRATED PROFILE CREATION FOR A SOCIAL NETWORK ENVIRONMENT

TECHNICAL FIELD

This disclosure relates in general to the field of communications and, more particularly, to a system and a method for initiating social interactions between users in a network environment.

BACKGROUND

Communications network architectures have experienced significant notoriety because they can offer the benefits of automation, convenience, and data management for their respective online communities. Certain network protocols may be used in order to allow an end user to be matched to other end users or to scenarios in which they stand to benefit (e.g., job searches, person-finding services, real estate searches, online dating, etc.). Such services may be referred to collectively as "matching services."

In the case of an online dating service, for example, an end user will typically be prompted to specify a variety of preferences to be used in matching the end user with other end users in a particular online dating community. The information each end user provides about him or herself may be viewed by other end users in the online community in determining whether to interact with that end user. In certain cases, the actual dating platform can participate in matching activities. This interventionist involvement and often spur or provoke new relationships being formed.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1 is a network diagram showing an operating environment of the present disclosure in accordance with one embodiment of the present disclosure;

FIGS. 2A-J are simplified screen shots of an example protocol for participating in an on-line dating service in accordance with one embodiment of the present disclosure;

DETAILED DESCRIPTION OF EXAMPLE EMBODIMENTS

Overview

Figure 2A:
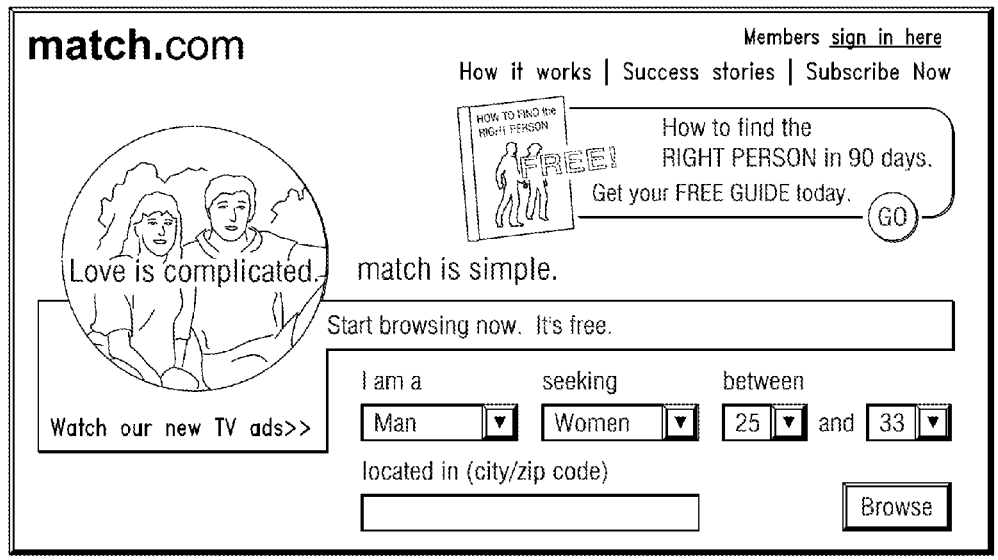

In an example, a system and method is disclosed for providing a node matching system such as an internet dating website. To ease creation of a profile, a node may be enabled to connect to a third-party social media site where the node already has an established profile. The established profile is imported, wherein common fields are directly mapped, inferred fields may be deterministically inferred, and other fields such as "likes" may be assigned relative weights based on recentness, subjective user rankings, or correlation to other "likes." The node may also be enabled to permanently (in a network sense) log in to the matching system via credentials for the third-party social media site.

Example Embodiments

The named inventors herein have observed that initializing an account with an online matching service such as a dating service may require a significant investment of time and energy. By nature, certain matching services require a lot of data to work effectively, and as a general proposition, the more personal data users enter, the better able the system is to match compatible users to one another. An additional frustration first-time users may face is that they may have already invested significant time and energy building profiles on third-party services, such as social networking services. Thus, users may feel like they are being forced to duplicate effort. Accordingly, the present specification discloses a system and method wherein a user may import his personal data from a third-party service into an online matching service, thus reducing barriers to initial signup, and possibly aiding in wider adoption of an online matching service.

FIG. 1 is a simplified block diagram of a system 10 for facilitating an online dating scenario in a network environment. In other embodiments in which communications or matching is valuable, system 10 can be leveraged to identify and to evaluate suitable candidates in other areas (e.g., hiring/employment, recruiting, real estate, general person searches, etc.). FIG. 1 includes multiple end users 12 and endpoints 13, a communications network 14, a web server 16 comprising memory 18 and a at least one processor 20, a website 22, and a data store 24. Data store 24 may be any type of mechanism for storing data, including but not limited to one or more files, databases, memory devices, mass storage devices, data centers, etc. System 10, users 12 interact with web server 16 via endpoints 13, each of which comprises an appropriate user interface for interacting with web server 16 via website 22 for facilitating functions and features described herein. In certain example implementations, website 22 and web server 16 are consolidated into a single component, physical structure, equipment, etc.

FIG. 1 may be configured such that inter- and intra-communications are readily achieved by any of the components included therein. The present disclosure is capable of providing both an online component (as illustrated in FIG. 1) and an off-line component such that one or more end users can meet, gather information, resolve to meet, and then subsequently meet in person with the assistance of system 10. Ancillary components to such a comprehensive process may involve pre-date profiles, post-date follow-ups, and a myriad of other significant features, some of which are outlined in greater detail below.

End users 12 may include a variety of types of end users, such as clients, customers, prospective customers, or entities wishing to participate in an online dating scenario and/or to view information associated with other participants in the system. End users 12 may also seek to access or to initiate communications with other end users that may be delivered via communications network 14. End users 12 may review data (such as user profiles, for example) associated with other users in order to make matching decisions or selections. Data, as used herein in this document, refers to any type of numeric, voice, video, or script data, or any other suitable information in any appropriate format that may be communicated from one point to another.

End users 12 may access the aforementioned data via endpoints 13, which may be inclusive of devices used to initiate a communication. Note that the broad term "node" encompasses any type of node or user device, or any type of endpoint discussed herein. Additionally, the terms "node" and "endpoint" are synonymous and can further include any type of profile to be used in the system discussed herein. Hence, these terms can include (but are not limited to) elements such as a computer, a personal digital assistant (PDA), a laptop or electronic notebook, a cellular telephone, an IP telephone, an iPhone™, an iPad™, a Microsoft Surface™, an Android™ phone, a Google Nexus™, or any other device, component, element, or object capable of initiating voice, audio, or data exchanges within communication system 10. The endpoints may be inclusive of a suitable interface to the end user, such as a microphone, a display, or a keyboard or other terminal equipment. Endpoints 13 may also include any device that seeks to initiate a communication on behalf of another entity or element, such as a program, a database, or any other component, device, element, or object capable of initiating a voice or a data exchange within communication system 10. In addition, each of the endpoints 13 may be a unique element designed specifically for communications involving system 10. Such an element may be fabricated or produced specifically for matching applications involving end user 12 and endpoint 13.

A user may employ any device capable of operating as an endpoint 13 to connect to communications network 14 via wire, wireless, cellular, satellite link or other suitable interfaces. Web server 16, which as previously noted includes memory 18 and at least one processor 20, hosts website 22 and has access to transmit and receive user or presence data (e.g., user profile data, user and/or user endpoint data, user contact data) from database 24. Presence data may be collected, aggregated, and utilized as required to facilitate communications between endpoints 12 over communications network 10 or other outside communication systems. Presence data may also include information and/or instructions enabling the creation, duration, and termination of communication sessions between diverse endpoints 13 that utilize different communication and/or networking protocols.

Communications network 14 is a communicative platform operable to exchange data or information emanating from endpoints 13. Communications network 14 represents an Internet architecture in a particular embodiment of the present disclosure, which provides end users 12 with the ability to electronically execute or to initiate actions associated with finding a potential match candidate. Alternatively, communications network 14 could be a plain old telephone system (POTS), which end user 12 could use to perform the same operations or functions. Such transactions may be assisted by management associated with website 22 or manually keyed into a telephone or other suitable electronic equipment. In other embodiments, communications network 14 could be any packet data network (PDN) offering a communications interface or exchange between any two nodes in system 10. Communications network 14 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment.

In one embodiment, web server 16 comprises a server that is operable to receive and to communicate information to one or more end users 12. In a generic sense, web server 16 can implement a computer-implemented matching system that provides a framework for suitable matching activities. Alternatively, web server 16 may be any switch, router, gateway, cache, server blade, software, processor, proprietary component, object, module, or element (or any combination of these) operable to facilitate communications involving end user 12. Web server 16 may be integrated with database 24 and/or website 22, where any one or more of these elements may share or otherwise coordinate the activities discussed herein.

In one particular embodiment, web server 16, via interaction with database 24 and/or in conjunction with website 22, is engaged in facilitating interaction(s) between parties interested in seeking a romantic partner (i.e., online dating). For example, website 22 can be online dating service provider www.Match.com, www.Chemistry.com, or any other suitable provider. In certain example scenarios, a given end user may pay a fee for a subscription-based service. Additionally, certain end user fee structures may apply to different tiers of service: some of which may entitle an end user to enhanced features on website 22 (e.g., the ability to communicate more frequently with other users, additional matches being provided (potentially, more frequently) to an end user who paid the higher fee structure, the ability to store data, the ability to share data, the ability to upload additional information, the ability to target specific searches based on particular criteria, the ability to receive preferential positioning in the context of being matched to other users, the ability to perform video calls (e.g., Skype, etc.) with other users, the ability to perform audio calls with other users, etc.).

In certain embodiments, website 22 is a computer-implemented matching system, which may be any website or architecture provided for facilitating a connection involving two or more people, and which may make use of a given profile, photograph, resume, article description, etc. This could include services associated with job placements, escort services, auction services, social media, real estate listings, recruiting services (e.g., in athletics, academia, employment scenarios, instances involving the sales of goods and services), etc.

Considerable flexibility is provided by the structure of web server 16 and website 22 in the context of system 10. Thus, it can be easily appreciated that such functions could be provided external to web server 16 or website 22. In such cases, such a functionality could be readily embodied in a separate component, server, processor, device, or module. Note that these online dating features and capabilities may be provided in just one of these elements, in both, or distributed across both of them. Hence, in certain embodiments, the online dating operations may be consolidated in a single website, where no redirection is needed, nor performed for the user.

In operation of an example embodiment, consider a case where a given end user is interested in participating in an online dating scenario. End user 12 can access website 22 via the communications network 14 (which in the example presented comprises the Internet) using endpoint 13, register, and create a profile on the site. Moreover, end user 12 can access website 22 through any suitable banner, pop-up, partnership, e-mail solicitations, direct mailings, etc. It can be appreciated that online commerce can be generated by a plethora of marketing tools and any such tools can readily cooperate with the operations of the present disclosure.

At this point, matching of any form can commence amongst the members of the online community. For example, in the context of a romantic endeavor, a person may begin the dating process or engage in communications that would spawn such dating. Other applications could include job applicants who are being sought by employers. Any of the individuals who reside in the online community can begin using any of the tools or capabilities of the platform.

FIGS. 2A-2J illustrate example screen shots that may be provided in the online dating process to facilitate presentation of information to and gathering of information from member end users. FIGS. 2A-2J are presented herein for purposes of discussion. It is imperative to note that these illustrations are only being provided to further outline a particular implementation of the present disclosure. In no way should these diagrams be used to limit or to restrict the broad teachings of the present disclosure. Such illustrative information has been offered earnestly and, thus, should not be construed to confine the broad applications of the present disclosure.

Figure 2B:
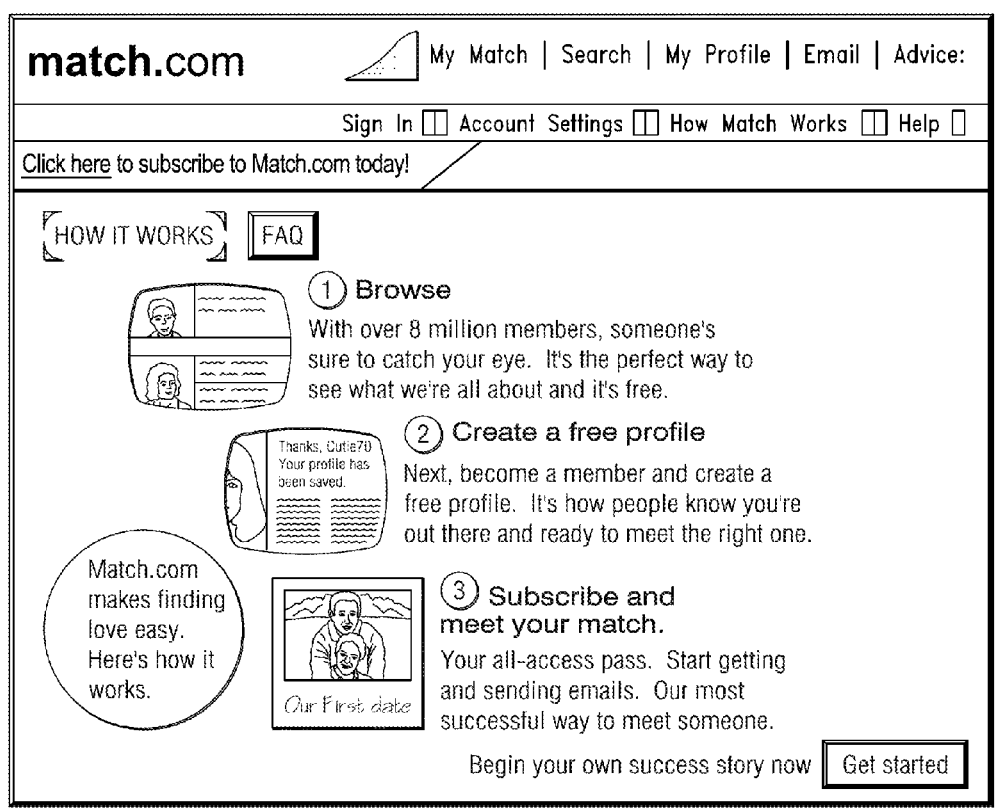

FIG. 2A is an example screen shot of a home page from which an interested end user may begin his/her journey. In the illustrated example, the home page solicits location information, such as a city or zip code, as well as an indication of the end user's gender and an age range and gender preference of persons the end user is interested in "meeting" via system 10. Subsequent to the end user's completion of the requested information and clicking on a "How it Works" icon on the home page of FIG. 2A, a screen shot as shown in FIG. 2B is presented to the end user. The screen shot of FIG. 2B provides a generic outline of the online dating process. As outlined in the screen shot of FIG. 2B, as a first step, an end user may choose to browse the website to view pictures of members along with summaries of the members' profiles. After browsing the website, the end user may decide to create a free profile. Once the end user browses the website and creates a profile, the end user may opt to subscribe to the service and receive information from/about others who are part of the online community. For purposes of example and ease of explanation, it will be assumed for the remainder of the discussion of FIGS. 2A-2D that the potential new end user investigating and ultimately subscribing to the service is a male named "Tom" who is interested in finding a female match.

Figure 2C:
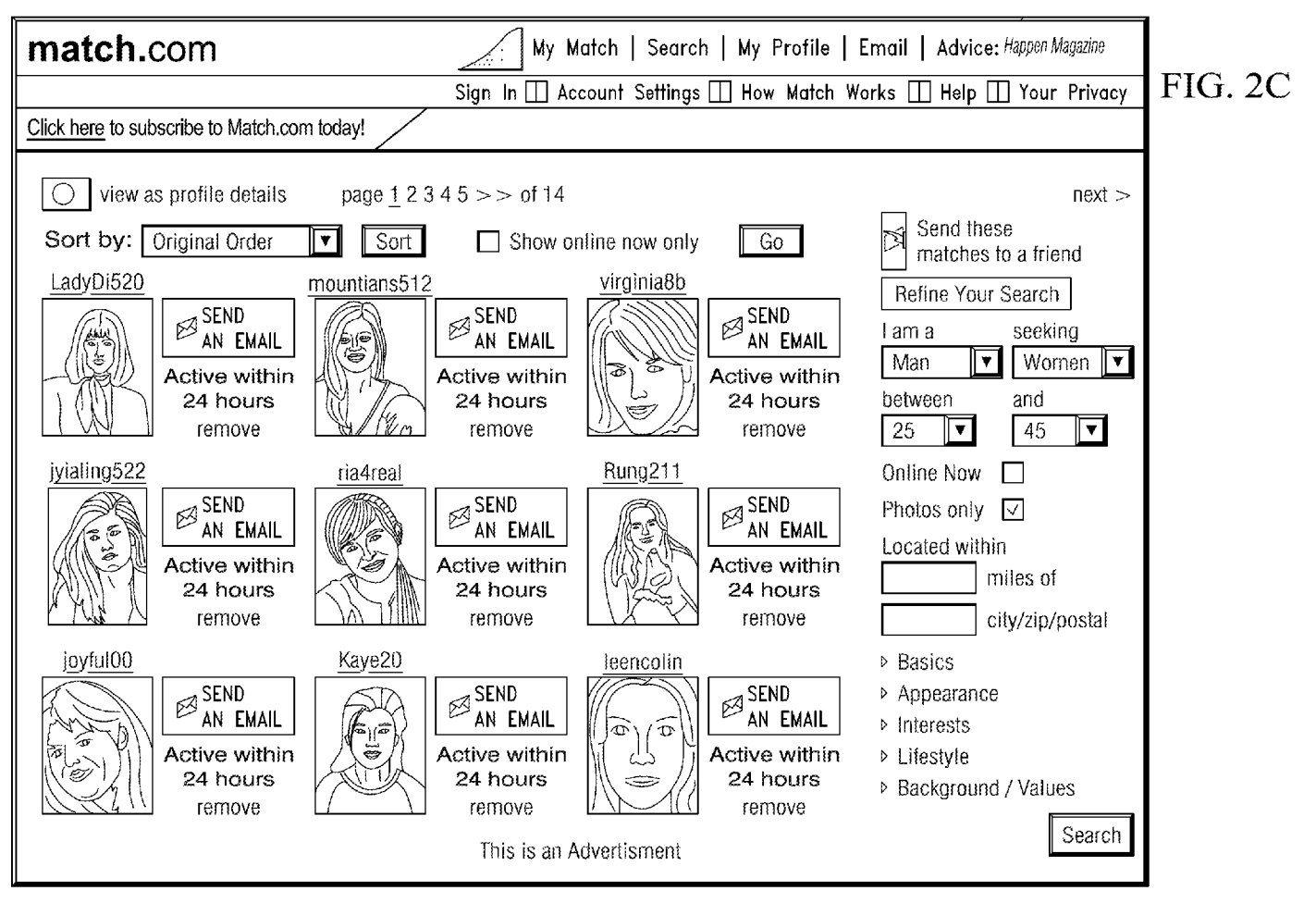

FIG. 2C is an example screen shot of a number of profiles that may be viewed by Tom during the browsing phase described above. In the context of this shot, Tom may be simply browsing. Assuming Tom has decided he would like to know more about one of the members whose profile is presented in FIG. 2C, he may click on the picture associated with the selected profile. For example, assuming Tom has decided he would like more information about "LadyDi520", clicking on her picture results in his being directed to a web page as shown in FIG. 2D, where he is solicited to sign up for the online dating subscription such that he can effectively contact his candidate selection. It will be noted that the information solicited using the page shown in FIG. 2C may be used in selecting matches for Tom. The information may also be displayed on Tom's profile or summary thereof presented to other users to assist those users in determining whether they are interested in interacting with him.

Figure 2E:
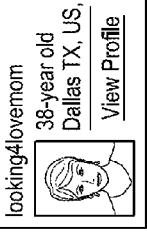
Figure 2F:
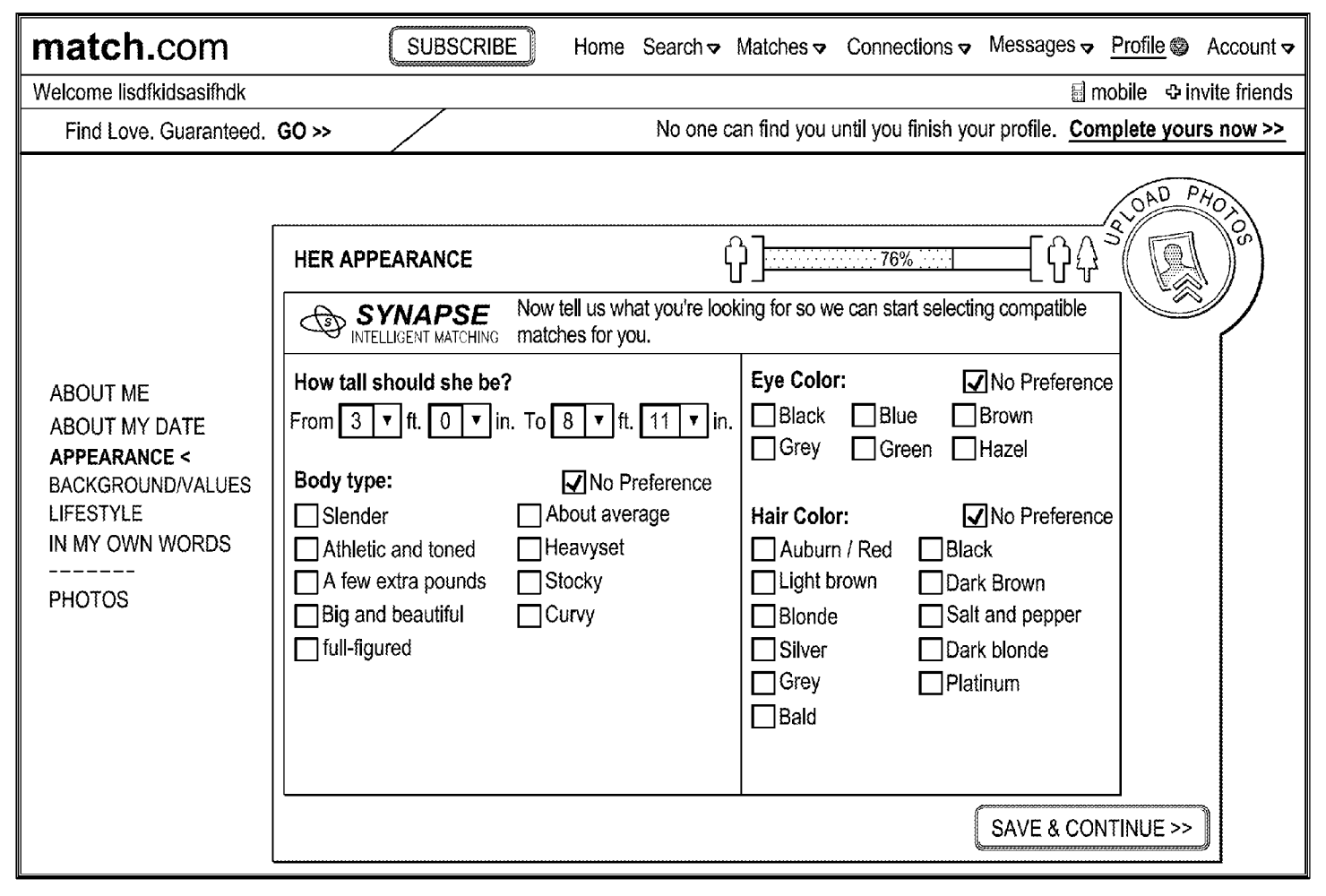
Figure 2G:
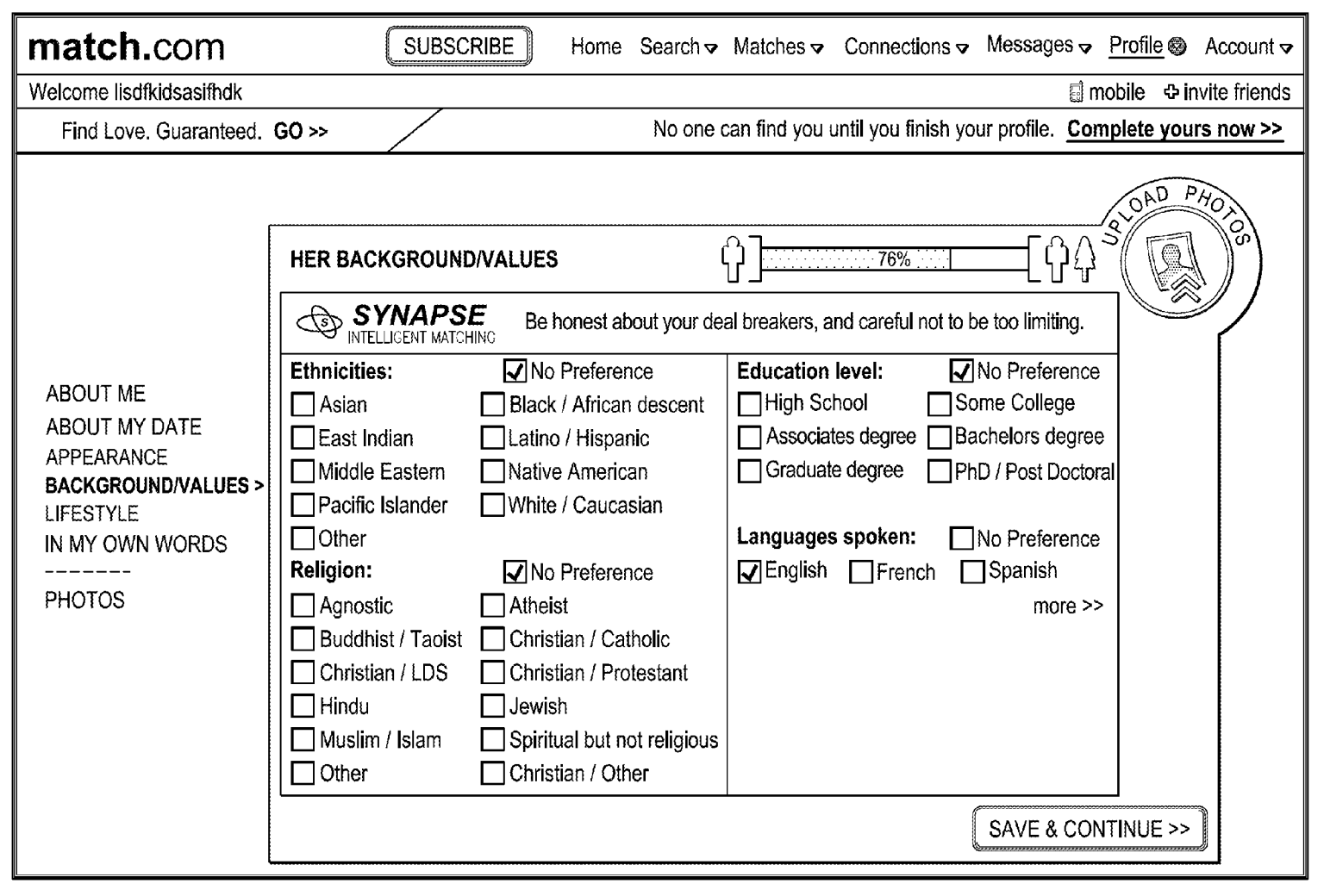

FIGS. 2E-2G illustrate various screen shots comprising a user information collection process in accordance with one embodiment. Using the web pages illustrated in FIGS. 2E-2G, system 10 collects a variety of information from an end user, including, but not limited to, basic information about the end user (FIG. 2E), as well as information about the type person the end user would be interested in dating, including information about a potential date's physical appearance (FIG. 2F) and background and values (FIG. 2G). It will be recognized that the information collected using the web pages illustrated in FIGS. 2E-2G is illustrative only and that any type/amount of information may be solicited in the illustrated manner.

FIGS. 2H-2J are example screen shots of the full profile of LadyDi520, the picture Tom selected while browsing. In illustrated profile, LadyDi520's match criteria are displayed, as well as other information that may be pertinent to a potential mate. Any suitable items can be provided in such a profile (such as interests, favorite hot spots, favorite things, desire for children, background, etc.). Virtually any type or format of information (inclusive of video and audio data) may be provided in such a profile. In particular, the profile includes information that was solicited from LadyDi520 when she set up her online dating account. The profile may include a photo, biographical information (e.g., gender, age, location, relationship status, etc.), physical information (e.g., height, weight, hair and eye color, etc.), interests (e.g., hobbies, "favorites," etc.), lifestyle information (e.g., exercise habits, employment, smoking/drinking habits, etc.), and background/values (e.g., ethnicity, faith, education, etc.). The profile may also include a section entitled "About My Date," in which the end user specifies preferences about the type of person he/she would like to meet/date (e.g., appearance, interests, faith, education, relationship goals, etc.). In an example, a complete user profile may also include a personal essay in which a user tells about himself or herself in narrative form. In some embodiments, a full profile, including the profile information provided by the end user and stored in the system, is displayed to interested viewers; in other embodiments, only a summary or subset of the profile information is displayed.

Figure 4:
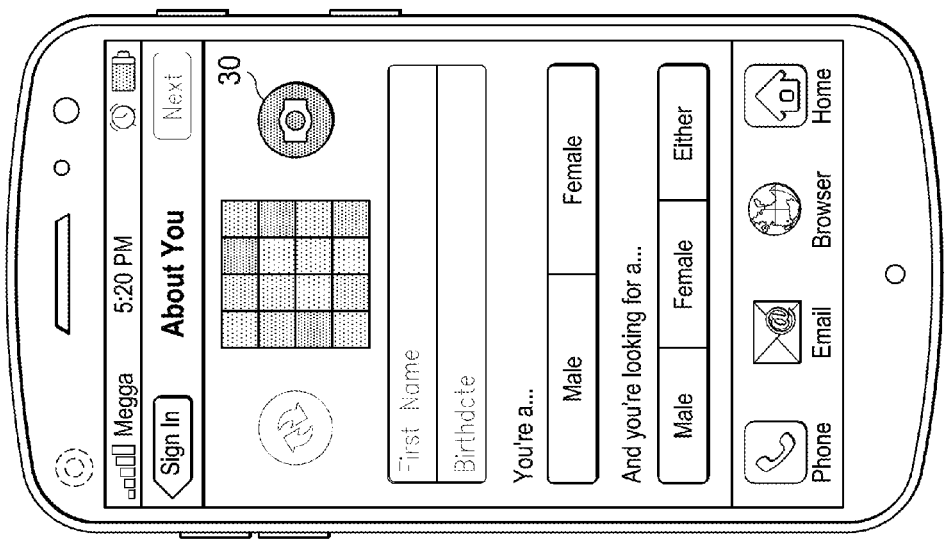
FIGS. 3-10 are simplified screen shots of an example protocol for registering with and submitting a date request using a Blind Date Request ("BDR") feature of an on-line dating service, such as illustrated in FIGS. 1-2J, in accordance with one embodiment of the present disclosure.
Figure 3:
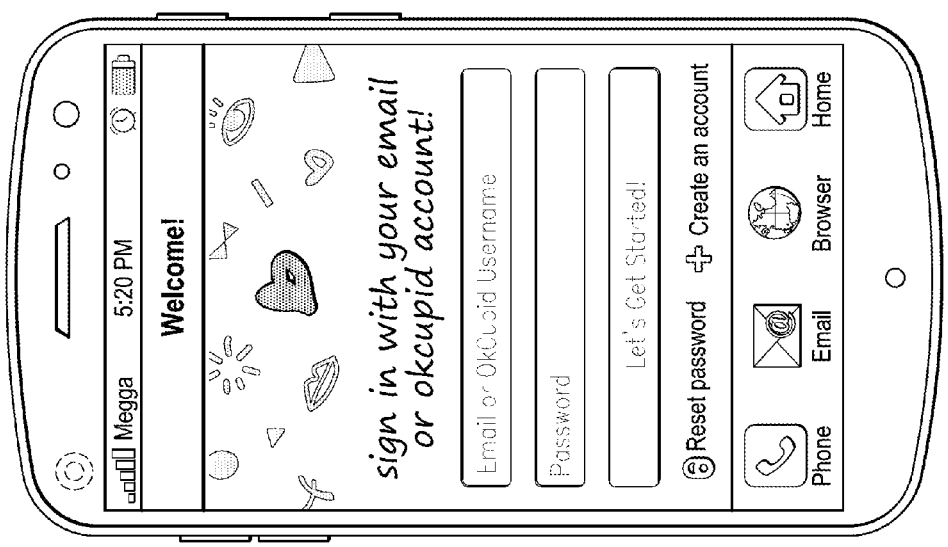

In one embodiment, the system 10 may include a feature referred to herein as a Blind Date Request ("BDR") feature. The BDR feature may be accessed in any number of known manners, including clicking on a link, icon, or other element provided in a GUI displayed on a web page. Alternatively, the BDR feature may be implemented as a standalone feature. In certain cases, the BDR feature can be provided as an application ("app") that is readily downloaded and/or purchased from an app provider (e.g., iTunes™, Match.com™, etc.). Once a user accesses the BDR feature, he or she may be required to create a special BDR account or to sign in using an existing account, as illustrated in FIG. 3. To create a new BDR account, as illustrated in FIG. 4, various information is solicited from the user, including, for example, the user's first name, birth date, gender, and the gender the user is seeking to date. The user is also prompted to click on a camera icon 30 to take a photo of himself or herself or to select a photo from photos that have already been uploaded to system 10 or are stored on the endpoint equipment employed by the user.

Figure 6:
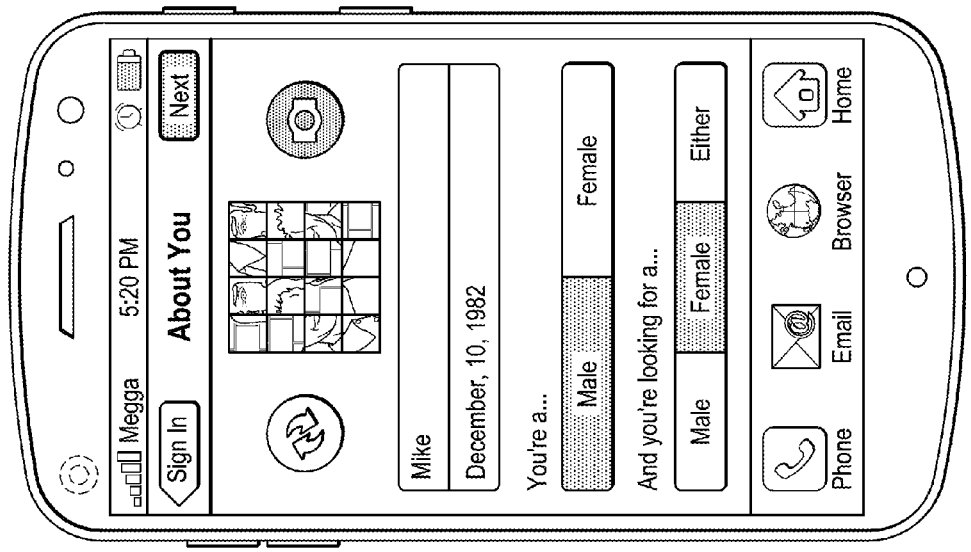
Figure 5:
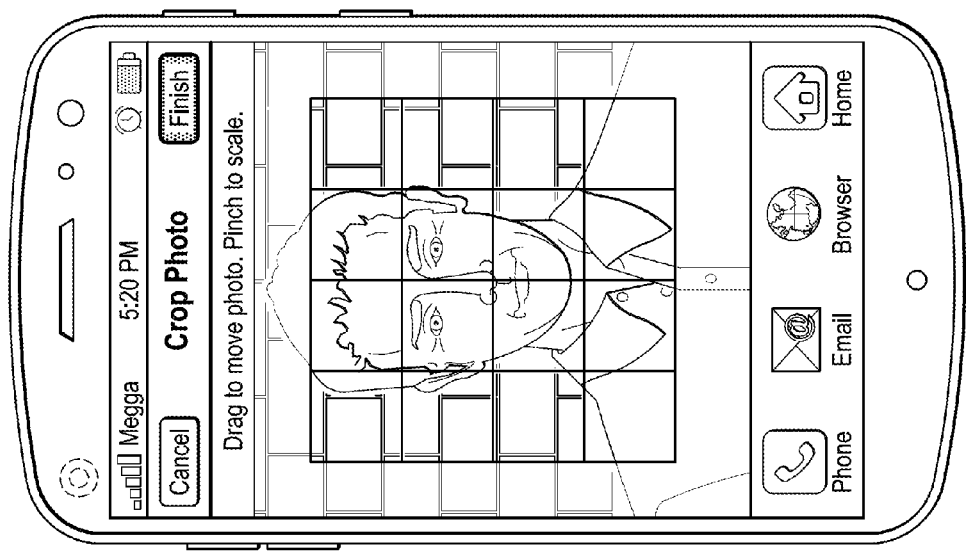
Figure 8:
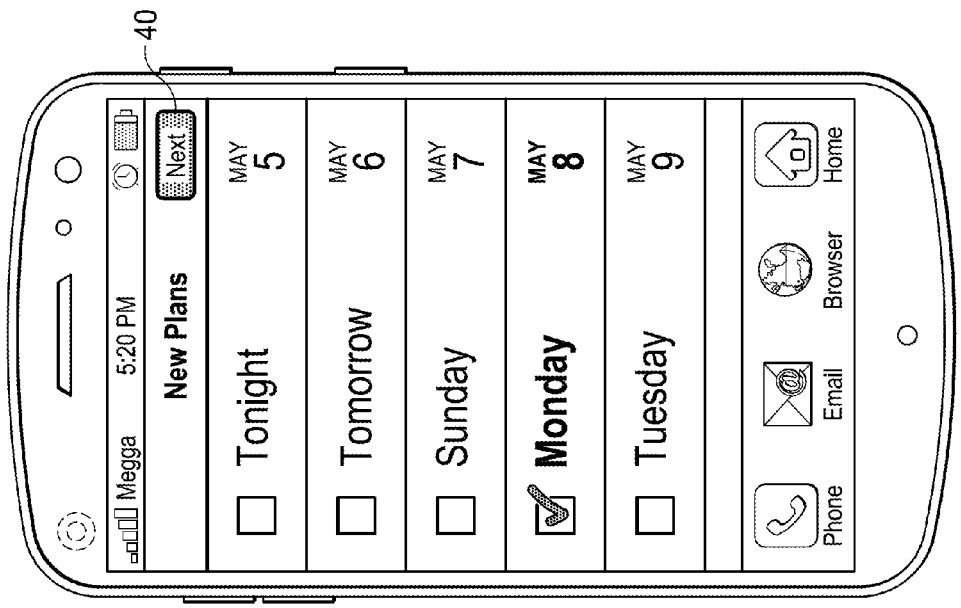
Figure 7:
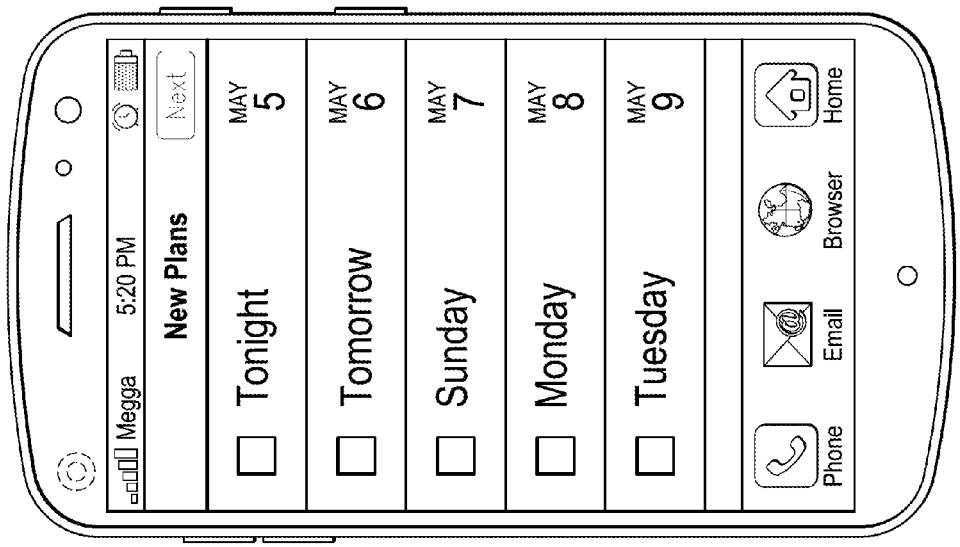
Figure 10:
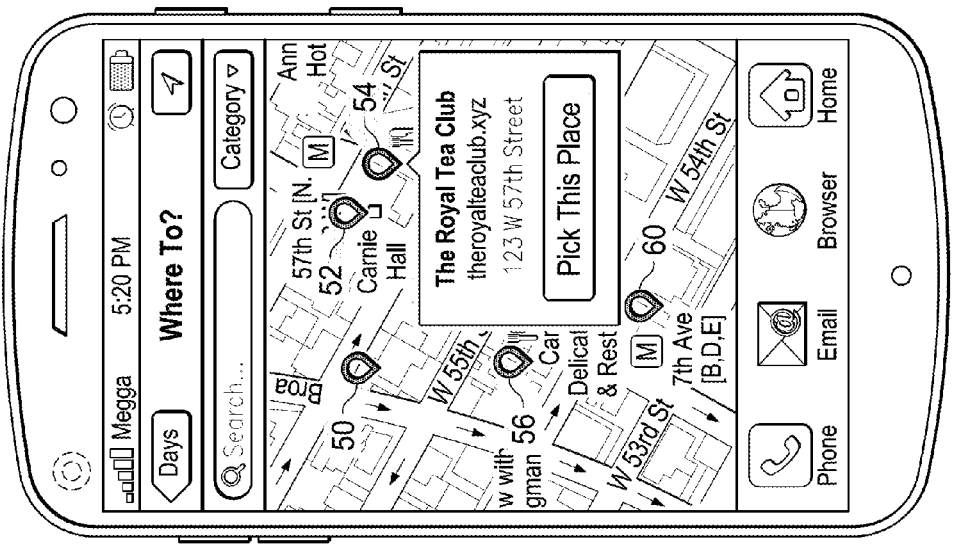
Figure 9:
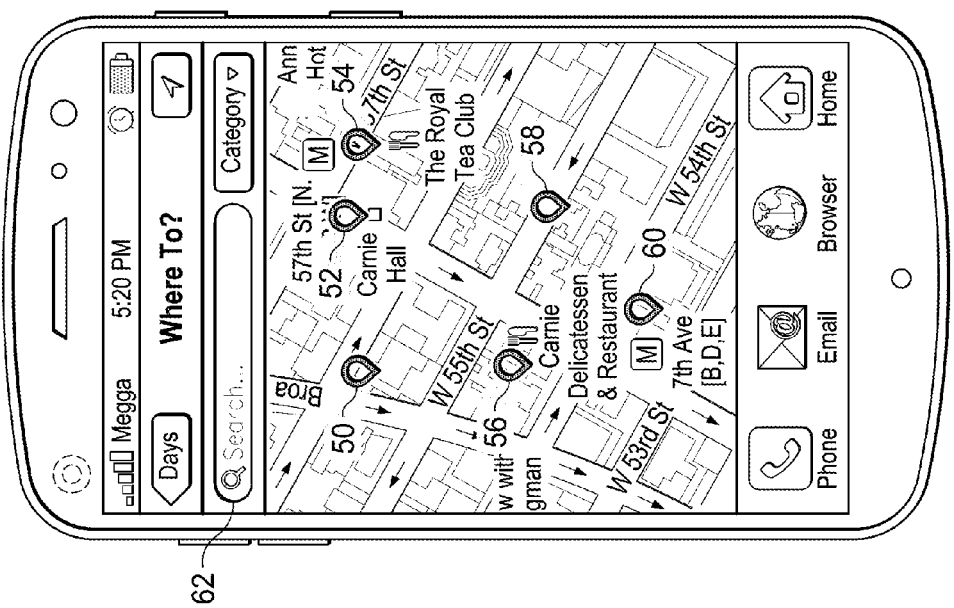

Once a photo of the user has been taken/selected, the user may edit the photo, as illustrated in FIG. 5. After all of the user's information, including the photo, has been submitted, as illustrated in FIG. 6, the user is prompted to begin developing a date request. The first step in the date request process is to select a calendar date on which the user would like to conduct the date. This is illustrated in FIG. 7, in which several calendar dates are presented to the user. The user selects a calendar date by clicking the box corresponding to the desired calendar date and then clicks a next button 40. It will be assumed for the sake of example that the user selects Monday, May 8 (FIG. 8). Next, the user is prompted to select a location for the date. In one embodiment, as illustrated in FIG. 9, the user is presented with a map with a variety of locations indicated by markers, such as markers 50-60. The locations indicated on the map may preferably be conveniently located proximate the user's current location or some other location that has been designated by the user. Alternatively, the user may search for a particular location (e.g., by entering a search query in a field 62, or may select a category, via a drop down menu 64, to filter displayed locations by type or some other criteria). Hovering the mouse cursor or other pointer over one of the markers 50-60 results in display of additional information regarding the location designated by the marker, as illustrated in FIG. 10. In the example illustrated in FIG. 10, "The Royal Tea Room" is designated by the marker 54. A web address and a physical address for The Royal Tea Room are displayed for the user's convenience. Selecting "Pick This Place" results in the displayed location being selected as the location for the date.

Figure 12:
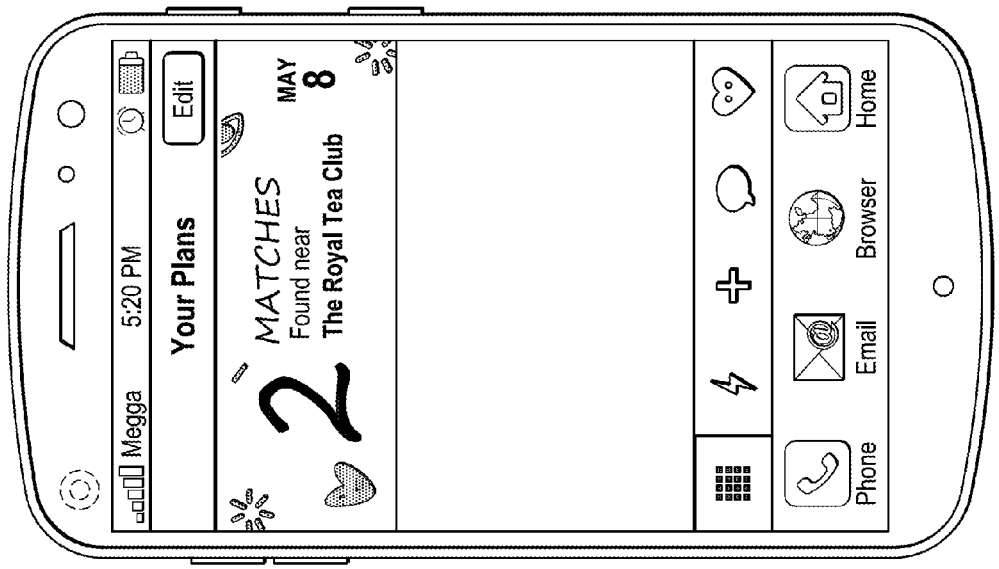
FIGS. 11-19 are simplified screen shots of an example protocol for scheduling a blind date using the BDR feature of an on-line dating service, such as illustrated in FIGS. 1-2J, in accordance with one embodiment of the present disclosure.
Figure 11:
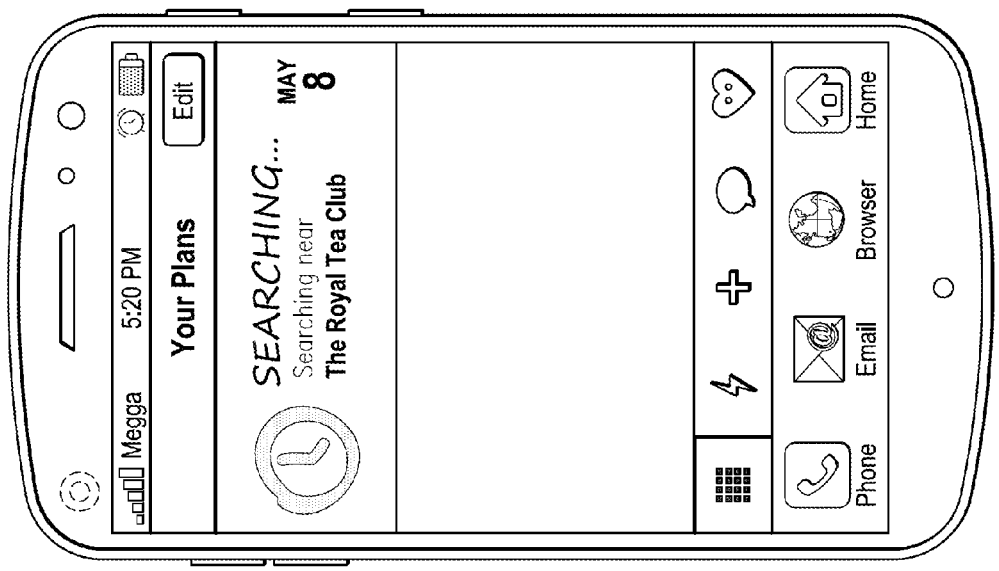

Once the user has selected a calendar date and location for his or her date, as illustrated in FIGS. 6-10, a search is conducted on a pool of date requests submitted by other users of the BDR feature to identify other users who have submitted identical or substantially similar (in terms of calendar date and location) date requests using the BDR feature. A screen such as that shown in FIG. 11 may be presented to the user while the system is searching for matches. Once the search has completed, a screen such as that shown in FIG. 12 may be presented to the user to notify the user of the number of potential matches found for the user's date request. [Note that in certain embodiments (but not all), the system can implement a filter that honors the "blind date" scenario such that the users that are matched using the BDR feature have not previously interacted online, through e-mail communications, or on the website (e.g., match.com).]

Figure 13:
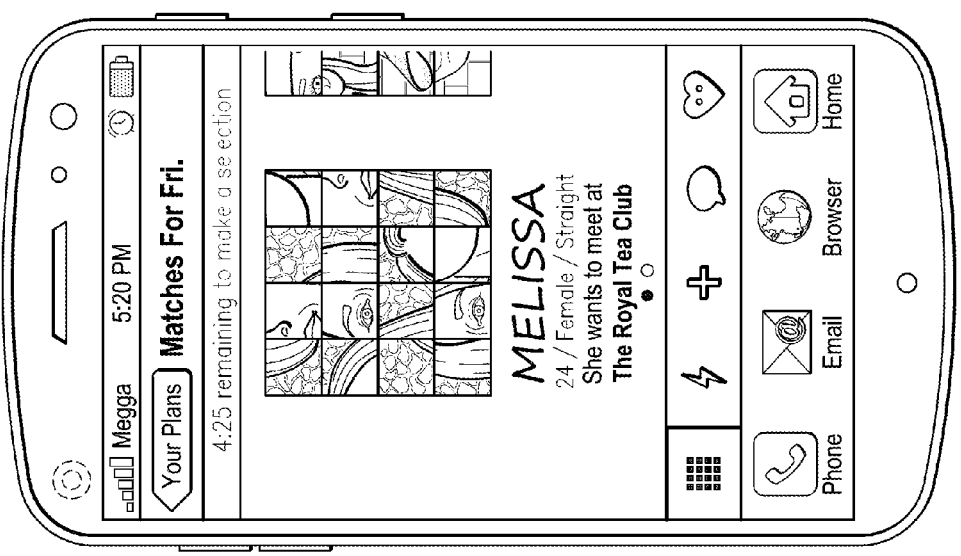

In the illustrated example, the user is notified that two matches have been identified at (or near) the location and on date specified in the user's date request. FIG. 13 illustrates a display of a first one of the identified matches. As shown in FIG. 13, the information provided to the user for the "match" is the same information solicited from the user as described with reference to and illustrated in FIG. 4, including the match's first name, age, gender, and sexual orientation; however, the match's picture has been partially obfuscated in any appropriate manner (e.g., by "puzzlization") to disguise the actual appearance of the user. Other techniques can involve distorting the image through pixel manipulations, removing certain blocks of image data, contorting the image (e.g., much like that of a funhouse mirror), etc. In this manner, the user may ascertain a general idea of the match's features (eye color, hair color, etc.), but the puzzlization will advantageously impede the ability of the user to base his or her selection solely on the physical appearance of the match. Although not shown, the user may "scroll" to pages displaying the other matches using one of any number of known navigation techniques.

Figure 14:
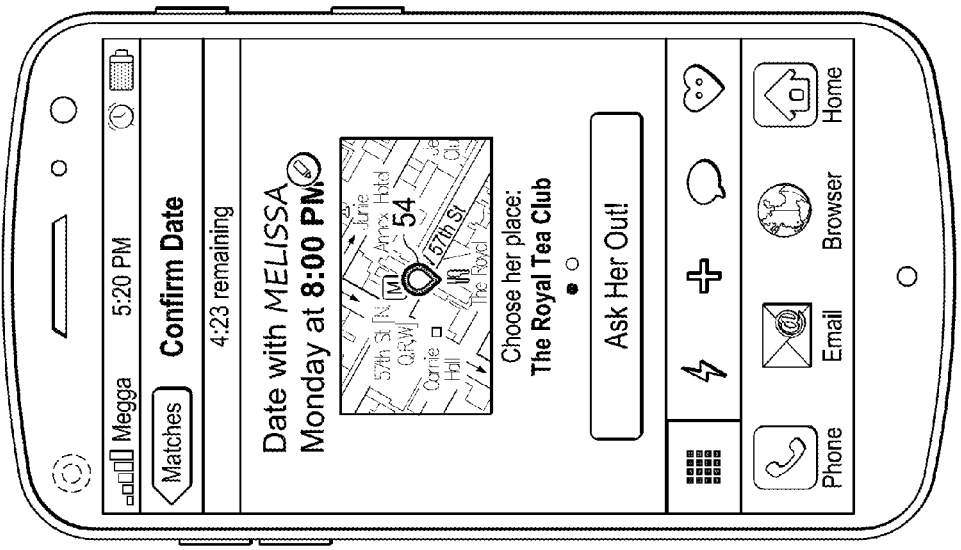
Figure 16:
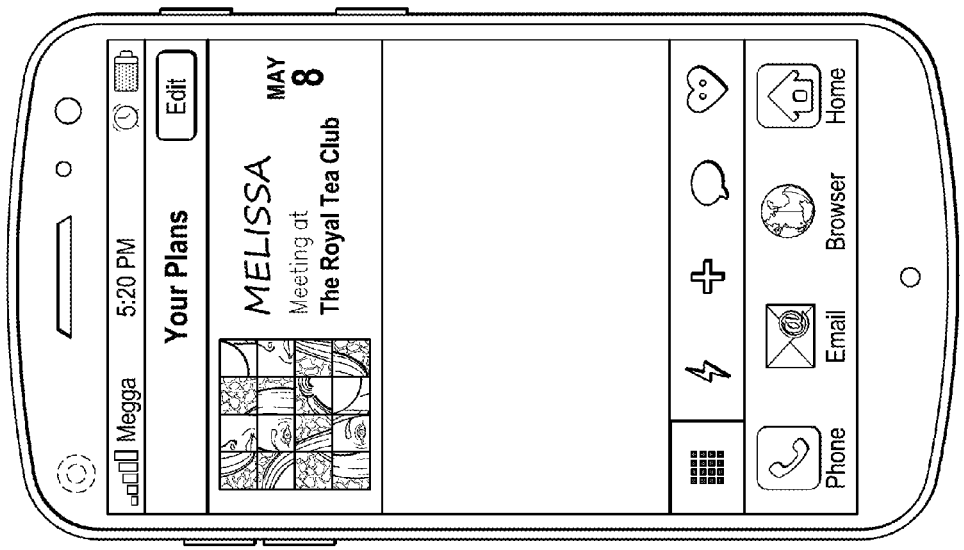
Figure 15:
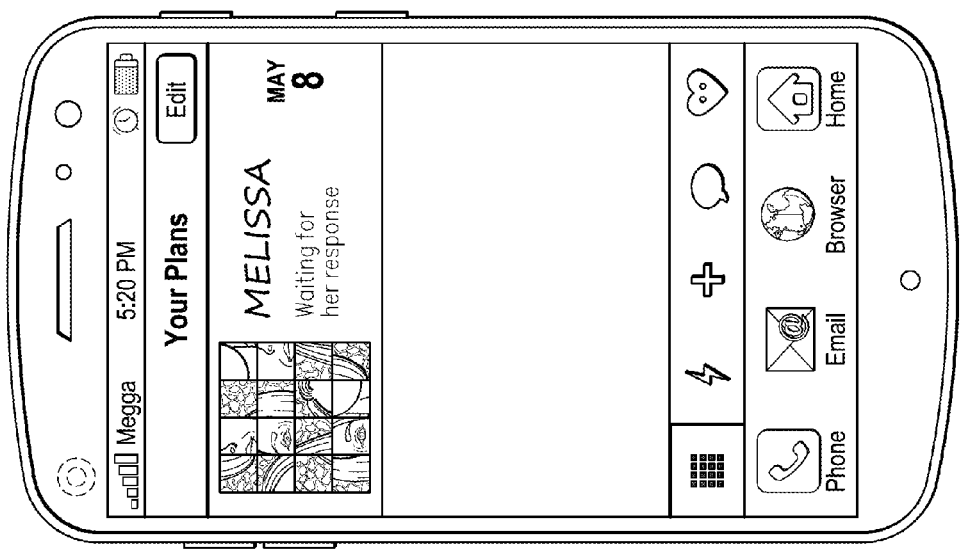
Figure 17:
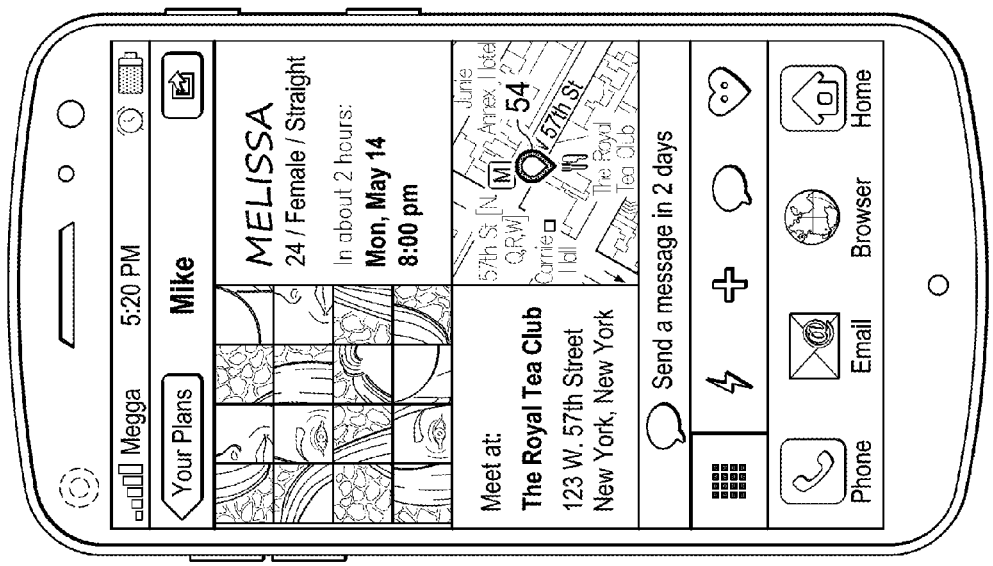

Assuming the user selects the match shown in FIG. 13 ("Melissa"), a confirmation screen is displayed, as shown in FIG. 14. Selecting "Ask Her Out" on the confirmation screen results in a date invitation being sent to Melissa. The date invitation will provide Melissa with the same information about the user that was provided to the user about her, including the user's name, age, gender, sexual orientation, and a puzzlized version of the picture the user submitted as illustrated in FIG. 4. Melissa can use this information to determine whether to accept or decline the received date invitation. The user may access a "Your Plans" page to determine the status of the date invitation. For example, as illustrated in FIG. 15, until Melissa has accepted or declined the date invitation, the user's plans will reflect that the user is waiting for Melissa's response. Assuming Melissa accepts the date invitation, the user's Your Plans page will be updated to reflect that the date has been confirmed, including the date and location of the date, as shown in FIG. 16. Clicking on the entry shown in FIG. 16 may result in display of more detailed date information, as illustrated in FIG. 17. It will be recognized that some other additional form of notification, such as an email or text message, may be provided to the user to advise the user of his/her date's response to the invitation.

Figure 18:
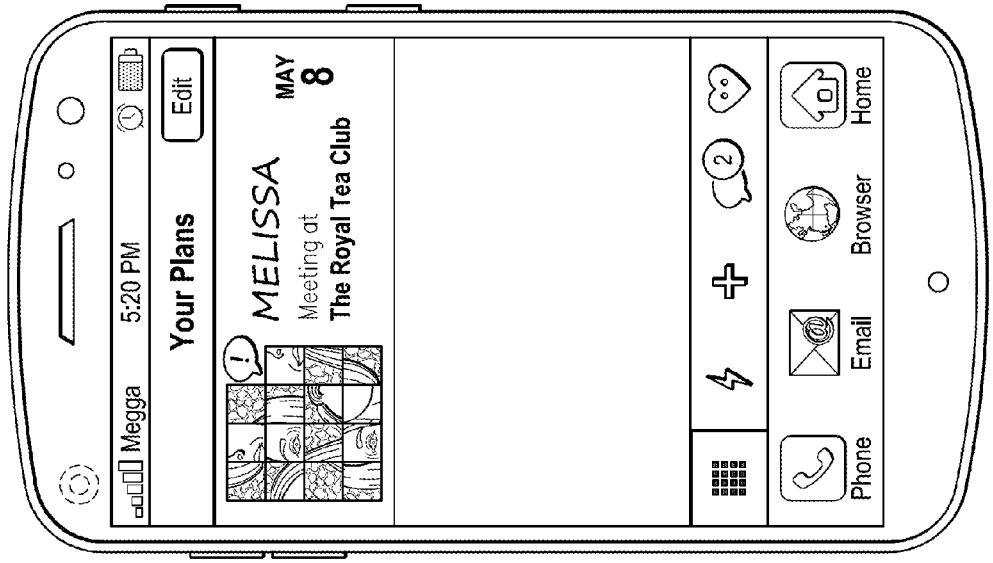
Figure 19:
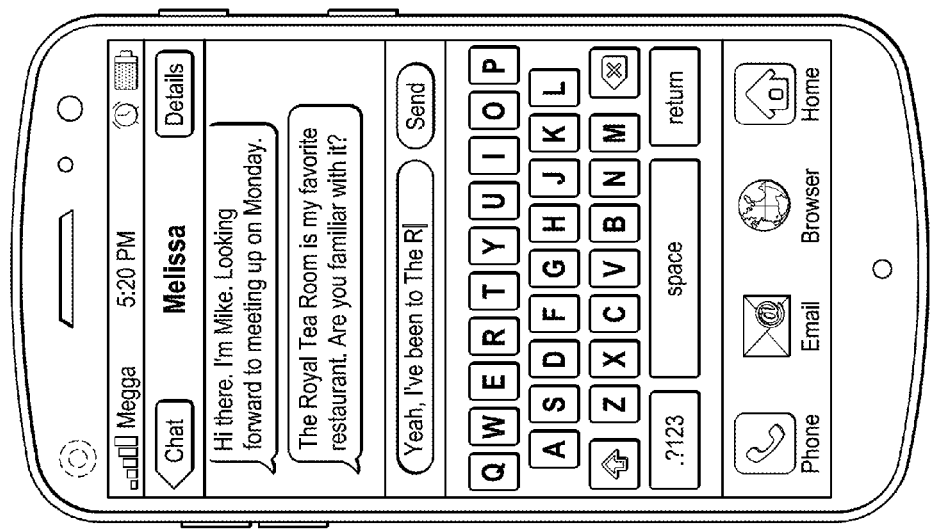

Referring to FIG. 18, a message icon 70 at the bottom of the page can be used to message, or chat with, the match and also reflects a number of messages received from the match. Clicking on the message icon 70 opens a chat window, as shown in FIG. 19, which enables the user and the match (e.g., Tom and Melissa) to refine their date plans, for example, or to familiarize themselves with one another before the date. In one embodiment, the message icon 70 is activated only between two users who have mutually agreed to a date via the BDR feature in the manner described herein.

Figure 20:
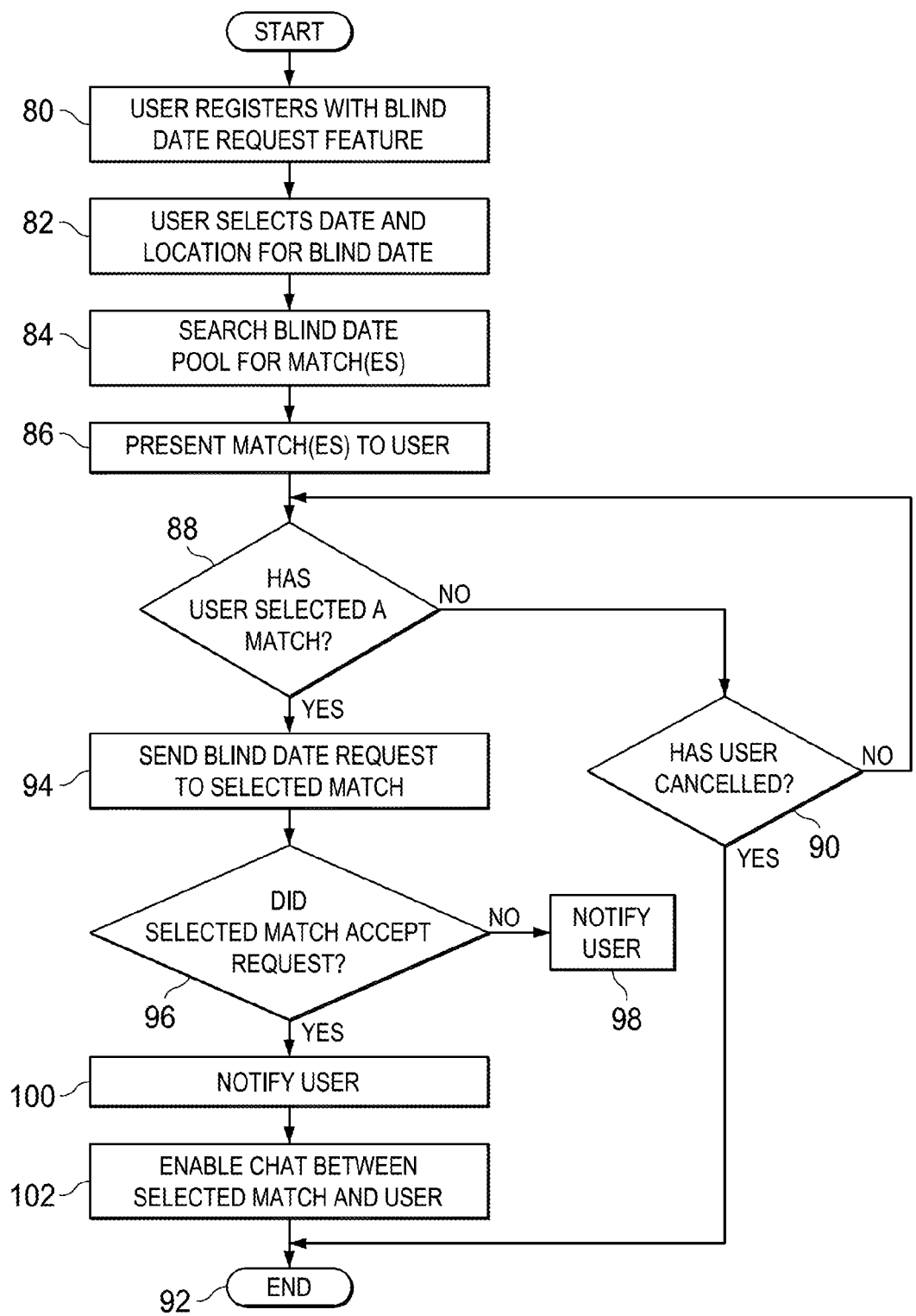
FIG. 20 is a flow diagram illustrating logic implemented by a BDR feature of one embodiment of the present disclosure.

FIG. 20 is a flowchart illustrating logic implemented by a BDR feature in accordance with one embodiment. In one embodiment, the logic for implementing the BDR feature (potentially to be embodied in software) could be provided in web server 16. In step 80, a user accesses the BDR feature and registers to use the feature (as shown in and described with reference to FIG. 4). As noted above, information solicited during the registration process may include the user's first name, age (or birthdate), gender, and sexual orientation ( ). The user will also provide a picture during the registration process of step 80. In step 82, the user selects a calendar date on which he or she would like to schedule a date. It will be recognized that this step may be performed in any number of manners. For example, the user may be presented with a list of calendar dates proximate the current calendar date from which to select one, as illustrated in FIGS. 7 and 8. Alternatively, the user may be prompted to enter a calendar date in a designated format or may be presented with a calendar from which to select a date by clicking on the corresponding day. Also in step 82, the user selects or enters a location for the date. As with the calendar date selection process, the location selection process may be performed in any number of manners, such as in the manner illustrated in FIGS. 9 and 10 or by enabling the user to enter a search query and select a location from the search results or to select a criteria by which to filter results and then select from a list of locations corresponding to the selected filter. It should be recognized that numerous instances of step 82 may be being implemented simultaneously and/or consecutively, with all of the date requests being added to a "pool" of potential matches to be accessed by the BDR feature.

In step 84, a pool of potential matches comprised of unfulfilled date requests submitted by other users via the BDR feature in the manner described above is searched to identify other users who have entered similar and/or identical date requests. It will be recognized that the date request submitted by the current user/searcher will be entered into the pool as well for others who subsequently use the BDR feature to request a date. It will be further recognized that the BDR feature may be customized only to provide to the user matches that are identical to the date request submitted by the user or may also provide matches that are within a certain tolerance of the calendar date/location indicated in the user's date request. For example, a user who has selected a particular coffee house as the location for the date may be willing to entertain the idea of conducting the date at a different coffee house located near the one originally selected.

Figure 21:
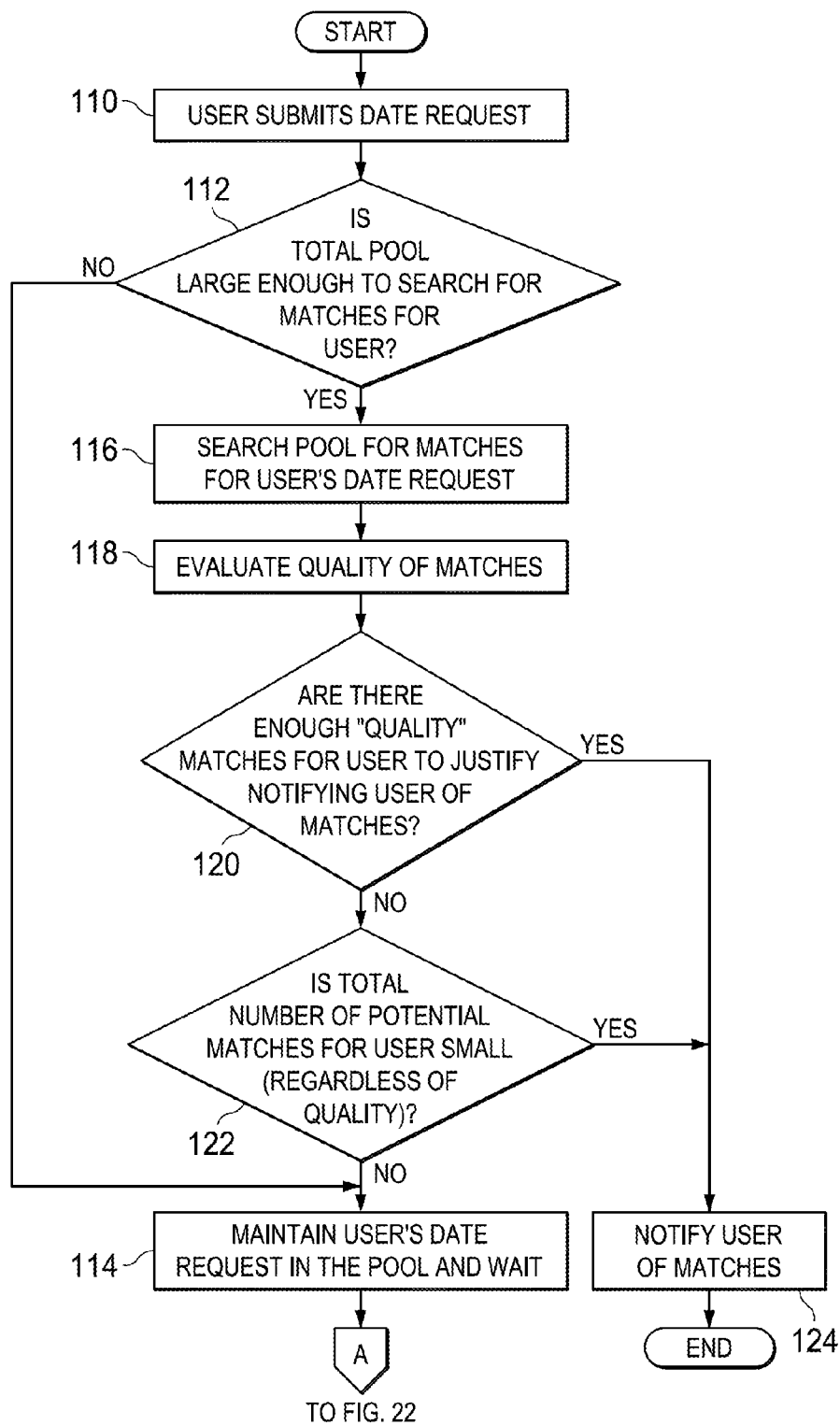
FIGS. 21-22 are a more detailed flow diagram illustrating logic implemented by a BDR feature of one embodiment of the present disclosure.
Figure 22:
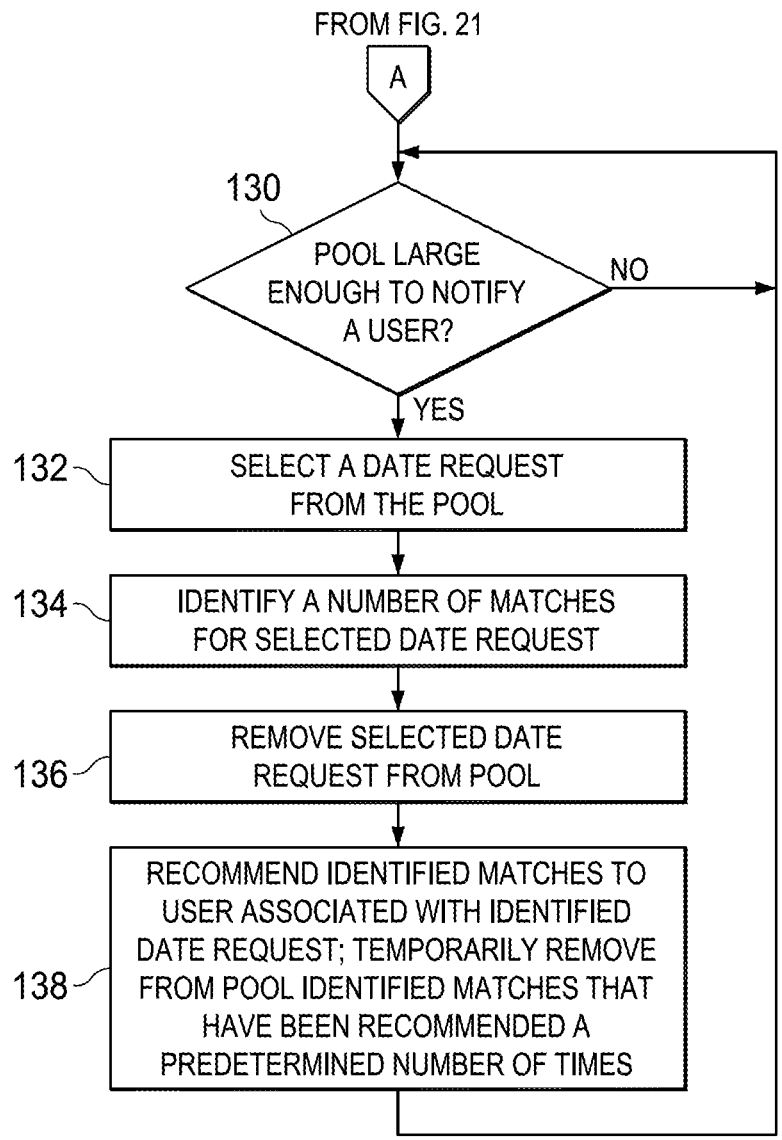

FIGS. 21-22 together illustrate a more detailed flowchart of logic implemented by a BDR feature in accordance with one embodiment. In step 110, a user submits a date request to the BDR feature, as described in detail above. In step 112, a determination is made whether the date request pool is large enough to search for matches for the user. The determination made in step 112 is based on the number of date requests in the date request pool that correspond to users who the current user would be interested in dating. For example, if the current user is a heterosexual man, in step 112, a determination is made whether the pool comprises a sufficient number of date requests from heterosexual women to justify searching for matches. Similarly, if the current user is a homosexual female, in step 112, a determination must be made whether the pool comprises a sufficient number of date requests from other homosexual women to justify searching for matches. Additionally, other factors, such as geographic location and similar age, may be considered in making the determination in step 112. What constitutes a "sufficient number" is configurable and may depend on the circumstances.

If in step 112 it is determined that the pool is not large enough, execution proceeds to step 114, in which the user's date request is placed in the date request pool to await further processing (as described below with reference to FIG. 22). However, if in step 112, it is determined that the date request pool is large enough to search for matches for the user, execution proceeds to step 116. In step 116, a search of the date request pool is executed to identify matches for the user. In step 118, the matches identified in step 116 are evaluated for quality. "Quality" matches are matches comprise date request that have been submitted by users that would likely be acceptable to the current user, in terms of gender, age, interests, etc. It will be recognized that these feature may be determined using the respective user profiles of the users in system 10. In step 120, a determination is made whether there are a sufficient number of quality matches for the user to justify notifying the user of the matches. If not, execution proceeds to step 122, in which a determination is made whether the total number of potential matches for the user is small, regardless of quality. For example, if a user lives in a small town, there may, by definition, only be a small number of users/date requests from which to choose. In this manner, step 122 functions as a sort of "reality check"; in other words, if the search results are about as good as can be expected, based on some external criteria, it does not make sense to continue to wait for better results. If a negative determination is made in step 122, execution proceeds to step 114, described above; otherwise, execution proceeds to step 124. Similarly, if a positive determination is made in step 120, execution proceeds to step 124. In step 124, the user is notified of the matches developed in step 116. In one embodiment, the user is notified of only a certain number of matches (e.g., four) even if more matches have been identified. The matches selected for presentation to the user may be selected based on the quality of match with respect to the user. Additionally and/or alternatively, it will be recognized that date requests selected from the pool may be recommended to more than one user at the same time; therefore, the matches selected for presentation to a user may comprise those matches that have not already been recommended to multiple users, thereby to decrease the possibility of a single user receiving multiple invitations in connection with a single date request. In certain cases, algorithms may be used in order to ensure that the pool is approximately loadbalanced such that users receive a roughly equal share of possible dating opportunities. Furthermore, user profiles can be evaluated in order to determine (for example, based on a lack of matching activities, or a lack of communication or solicitations involving other users at the website) which users should receive priority for the BDR opportunities. This could involve heightened placement opportunities for a stagnating user, increased presentment opportunities (e.g., where the user could be featured more for other users to consider), etc.

Referring now to FIG. 22, in step 130, a determination is made whether the date request pool is large enough (in terms of raw numbers of date requests in the pool) to justify attempting to fulfill a date request therefrom. In step 132, a date request is selected from the pool. In one embodiment, a date request submitted by a "high priority" user is selected. A high priority user may be one who is highly rated by other users based on various criteria; alternatively, a high priority user may be one who has had one or more (subjectively) negative dating experiences with others on the site and who is "due" a positive dating experience. In other cases, a high priority user may be reflective of a user profile that is somewhat stagnant on the website (e.g., a lack of communications or solicitations, as discussed above). Hence, any suitable historical data may be used in order to designate a particular one of the users in a pool as having some type of priority. The priority would allow for the stagnating user to receive preferential treatment (e.g., listed first in a queue for another user, presented first (or at the top of a queue) for a requester in a BDR scenario, prominently displayed on the website, be the first profile that is pulled into a particular matching opportunity, etc.). Furthermore, it should be recognized that selection of a date request from the date request pool may be performed in any number of different manners, depending on the goal of the system, the administrator, the company collecting revenues for providing matching services, etc.

In step 134, a number of matches are identified for the date request, based on date and location. It will be recognized that the number of matches provided to a user may be limited to a particular maximum number; if less than the predetermined maximum number of matches are identified, then all of the matches will be presented to the user, as described below. In step 136, the date request submitted by the identified user is removed from the date request pool. In step 138, the identified matches are recommended to the identified user. Additionally, identified matches that have been recommended to a predetermined number of users (e.g., five) are temporarily removed from the pool to reduce the risk of conflicting matches. Execution then returns to step 130.

Figure 23:
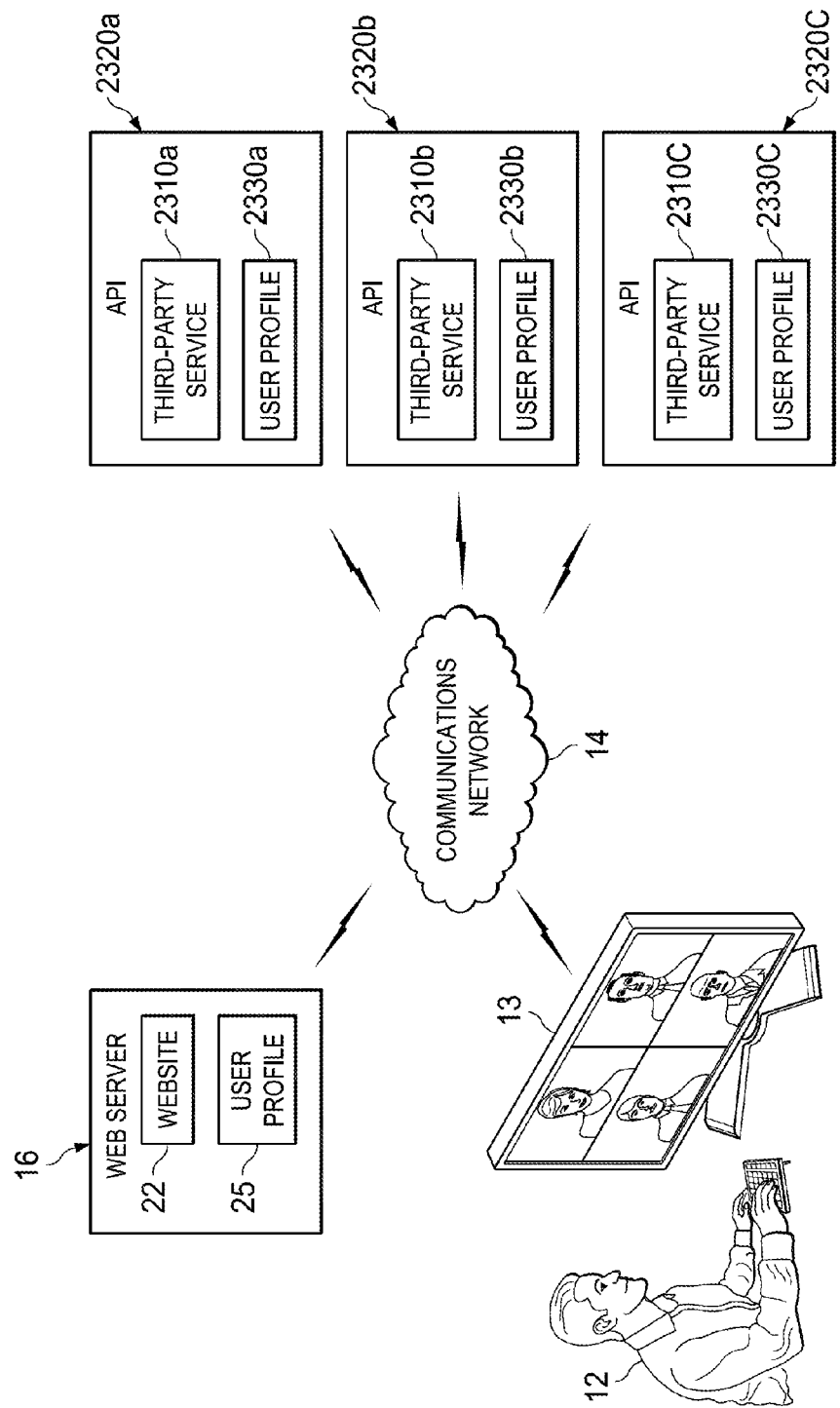
FIG. 23 is a network diagram of a user interacting with an online dating service and a plurality of third-party services according to one or more example embodiments of the present specification.

Importantly, the system and methods described in FIGS. 1-22 are most successful when a critical mass of users participate in the service. Thus, it is advantageous to provide means for reducing "friction" associated with creating a new user account to help encourage such a critical mass of users, including enabling users to create an initial profile via an existing third-party user account. FIG. 23 discloses an embodiment of a server 16 interacting with a third-party service 2320 according to one or more example embodiments of the present specification. For a user 12 such as user "Tom" to take full advantage of the system and methods described in FIGS. 1-22, he must enter a great deal of data into his profile so that server 16 can make appropriate matches, as well as make useful recommendations such as for activities and locations. According to certain prior art methods, it may be necessary for Tom to manually enter profile information such as name, age, and sexual orientation to create a basic profile. Tom may also enter additional information to help strengthen his profile and the probability of a successful match, including for example, his city location, relationship status, physical information (e.g., height, weight, hair and eye color), interests (e.g., hobbies, "favorites," "likes"), lifestyle information (e.g., exercise habits, employment, smoking/drinking habits), and background/values (e.g., ethnicity, faith, education, employment). Tom's profile may also include an "About My Date," profile, in which the end user specifies preferences about the type of person he would like to meet or date, such as appearance, interests, faith, education, relationship goals, pet preferences, hobbies, and location by way of non-limiting example.

In some cases, entering this large volume of data can be cumbersome and may serve as a deterrent for an otherwise willing user to sign up for a matching service. Furthermore, Tom may find it frustrating that he has already entered some or all of his profile data into some other social networking site, such as Facebook or LinkedIn, by way of non-limiting example. For example, Tom may have an existing user profile 23330a with third-party service 2310a. Third-party service 2310a may provide an application programming interface (API) 2320a, which may be configured to enable other services to access data from third-party service 2310a, including for example, reading or updating user profile 2330a. Tom may also have accounts with third-party service 2310b and third-party service 2310c. Between the three profiles, Tom may have entered extensive profile information that may be used to fill in details for Tom's user profile 25. The entry of these data may represent a substantial investment of time and effort for Tom. Tom may therefore wish to benefit from that investment when he creates a user profile 25 on website 22. Furthermore, Tom may want to synchronize his investment in third-party services 2310a, 2310b, and 2310c by synchronizing their respective profiles to the extent possible. Thus, it is desirable for server 16 to be enabled to access each third-party service 2310 via its respective API 2320 and to both harvest profile data from third-party services 2310, and also to optionally write to the profiles 2330 of third-party services 2310.

Advantageously, importing profiles can also ease profile creation in the case of a matching service operating web server 16. For example, matching services may require new user profiles to be reviewed for suitability and authenticity. This avoids the problem, for example, of "spam bots" or malicious software flooding sites with fake user accounts. Some level of assurance is provided by verification techniques such as "CAPTCHAs," but in a matching service, a higher degree of confidence may be necessary. It may thus be desirable to provide a means of automatically verifying that a user is indeed authentic.

A user who creates a profile based on a third-party service 2310 may be automatically verified in some cases. For example, if Tom imports a Facebook profile, and web server 16 can verify via API 2320 that Tom has 350 friends, and that those friends interact with Tom online via posts, sharing, comments, or other similar means, it may be determined with a high degree of confidence that Tom is a legitimate user. In this case, however, having too many friends may actually be a mark against Tom's authenticity, as one method of spam profiles is to send "friend" or "connection" requests to huge numbers of users in hopes that a certain small percentage will accept. Thus, if Tom as 1,000 or more friends, and particularly if Tom has only minimal interaction with those friends, Tom's profile may be flagged for human review to verify that it is not a spam profile.

Other factors may also be used to verify that a user is legitimate to a high degree of confidence. For example, if a profile is imported from a professional network, Tom's professional credentials may be matched to connections. If Tom's profile indicates, for example, that he attended Johns Hopkins medical school and is a surgical resident at Massachusetts General, those may be verified with a high degree of confidence if Tom has many connections related to those institutions. Further confidence may be gained if Tom has received endorsements or other similar recommendations from other professionals.

In general terms, Tom's profile may be assigned a confidence score based on data gleaned from third-party profiles 2330. Factors may be weighted and then summed, averaged, or otherwise joined, to assign an overall confidence score to Tom's profile. If Tom's score is greater than a threshold, it is automatically verified. If it is less than the threshold, it is flagged for human review. Further, if Tom's profile falls below a second threshold, it may simply be discarded.

Figure 24:
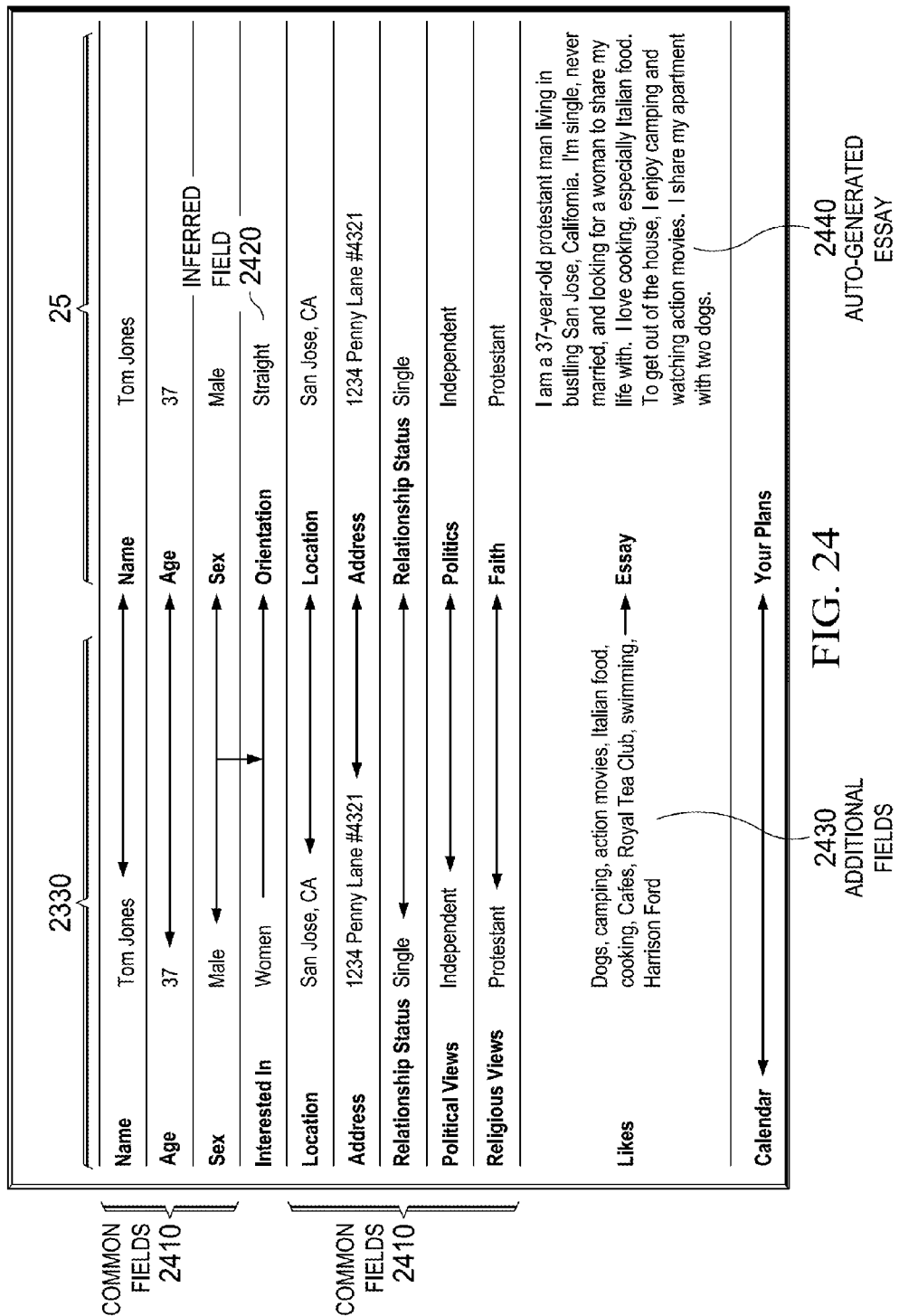
FIG. 24 is a block diagram of mapping of user fields from a third-party service to an online dating service according to one or more example embodiments of the present specification.

FIG. 24 is a diagrammatic representation of mapping fields from a third-party service profile 2330 to a user profile 25 according to one or more example embodiments of the present specification. Currently, there is no single standard governing profiles for social media networks and other online resources. Thus, each vendor defines its own format. Although these formats are not unified by a single standard, they often share many fields that can either map directly to corresponding fields, or that can be used to deterministically infer other fields. There may also be fields that, while they do not map directly or deterministically, may be used to build useful data. In the example of FIG. 24, a number of common fields 2410 are shown between third-party profile 2330a and user profile 25. Examples of common fields 2410 include name, age, and sex. Advantageously, these are fields that are frequently found in profiles and that have relatively definite values.

An example of an inferred field 2420 is also shown. In this example, third-party profile 2330 includes a "sex" field and an "interested in" field. User profile 25 includes a "sex" field, but rather than an "interested in" field, user profile 25 includes an "orientation" field. The "orientation" field does not map directly to the "interested in" field, but "orientation" can be inferred deterministically from the two fields "sex" and "interested in." For example, Tom Jones is a male interested in women, thus it can be inferred deterministically that Tom Jones' sexual orientation is "straight." If on the other hand, Tom Jones was interested in men, his orientation could be deterministically inferred to be "gay," and if he was interested in both men and women, his orientation could be deterministically inferred to be "bisexual." Note, however, that while three deterministic orientations are disclosed here by way of example, the example is not intended to be limiting. Depending on social conventions, additional categories may be defined. For example, a person may have a personal gender identification that is not traditionally associated with his or her physical sex, or a person may be transgendered and/or interested in a transgender partner. Thus, for example, a transgender female interested in a non-transgender male, or vice versa, may not be considered "straight" in the traditional sense, and thus it is contemplated that additional categories may be defined, and that some categories may be deterministically inferable, while others may not.

Furthermore, in some cases, third-party profile 2330 may not include an explicit "sex" field, or the user may have left in blank. In that case, "sex" may be inferred based on interaction with other users. For example, if third-party profile 2330 includes a number of posts referring to "my wife" or "my girlfriend," the user's status may be inferred to be "male," and relationship status may be inferred to be "married" or "in a relationship." Similarly, "my ex-wife" may infer "male" and "divorced." Comments from other users may also be used, for example, comments referring to "your wife" or "your girlfriend," or comments about the user using "he" or "him" as pronouns. Furthermore, a cross-reference of "likes" and "interests" may provide a degree of confidence about gender. Gender is disclosed here as a non-limiting example, but many other fields could be inferred, such as professions, academic credentials, religion, and politics by way of non-limiting example.

Third-party profile 2330 may also include certain fields that either include open-ended information or data that do not otherwise map precisely to a field of user profile 25. For example, certain social network services may provide open-ended selection of "likes," "favorites," or other similar designations, with a theoretically infinite number of possible "likes." In some cases, those designations may evolve gradually over time. For example, while browsing a social network site, user Tom may see a link to "Top Gun," a movie he has seen and enjoyed but has not watched or thought about for a long time. Because a relatively easy mechanism may be provided for Tom to "like" Top Gun (such as simply clicking on a "like" button), Tom may accumulate a large number of likes over time. Not all of these likes will be of equal value to Tom. Some may be casual "likes" and some may be serious interests.

Some social media sites provide additional options for ranking or assigning grades to likes. In those cases, more important likes may be designated by higher ranks or grades. In other cases, the most recent likes may be deemed the most valuable likes. In another example, correlation may be used to rank likes. For example, if Tom likes Harrison Ford, and also likes the three original Star Wars movies, the four Indiana Jones movies, Clear and Present Danger, and Air Force One, it may be inferred that Tom's "like" for Harrison Ford may be relatively important; whereas if Tom likes Tom Cruise but the only movie he likes starring Tom Cruise is Top Gun, Tom's "like" for Tom Cruise may be ranked as relatively less important. Actors and films are disclosed herein by way of example, but it should be noted that cross-correlation of likes for purposes of weighting or relevance can be extended to many other areas, including by way of non-limiting example, music, musicians, artists, locations, businesses, cities, restaurants, cuisine, clothing, electronics, and brands.

In an example where a user is permitted or required to submit an essay as part of his user profile 25, some users may find initial drafting of the essay to be intimidating or difficult. Thus, in an example, a combination of common fields 2410, inferred fields 2420, and additional fields 2430 may be used to create an automatically-generated essay 2440. It should be noted that in some embodiments, automatically-generated essay 2440 will be considered only a draft or a guideline to help users get started on drafting a more personalized essay, though in other embodiments it may be used as a final essay.

Based on data imported in FIG. 24, Tom's draft essay may include the following text:

I am a 37-year-old Protestant man living in bustling San Jose, Calif. I'm single, never married, and looking for a woman to share my life with. I love cooking, especially Italian food. To get out of the house, I enjoy camping and watching action movies. I share my apartment with two dogs.

In some embodiments, appropriate adjectives may be inserted based on profile information. For example, San Jose, Calif. may be identified as "bustling" based on its proximity to Silicon Valley and other important business activities. In this example, a focus is made on identifying positive-sounding adjectives that are reasonably applicable to the target (for example, describing Portland, Oreg. as "sunny" may seem disingenuous). To that end, a global or local attributes database 27 may be maintained with attributes commonly associated with known entities. It is expressly understood that attributes database 27 may be operated by web server 16, or by a third party that may make the database accessible via an application programming interface. In an example, attributes database 27 may have an entry for San Jose, Calif., with "bustling" being one possible entry. Attributes database 27 may also include other useful information for identifying relatively important likes, for example, an entry identifying Harrison Ford as an actor and correlating him to a plurality of movies he has starred or appeared prominently in. Attributes database 27 may also identify certain addresses as apartments, homes, town homes, or condominiums, certain eateries as "cafes" or "restaurants," and so forth. Attributes database 27 may also identify "Royal Tea Club" as a society primarily of mature women and thus relatively more likely to be ironic, accidental, or of relatively low importance. To improve accuracy over time, heuristic algorithms may be employed. For example, if two distinct populations group around "Royal Tea Club," it may be determined that one is an actual club for mature women who enjoy high tea, while the other is the name of an underground German grunge band. In that case, automatically-generated essay 2440 may be modified as follows:

I am a 37-year-old Protestant man living in bustling San Jose, Calif. I'm single, never married, and looking for a woman to share my life with. I love cooking, especially Italian food. To get out of the house, I enjoy camping, watching action movies, and checking out indie bands like Royal Tea Club. I share my apartment with two dogs.

In cases where a field provides a value that does not already include an entry in attributes database 27, a new entry may be created. In an example, an automatic internet search is performed, searching for attributes associated with the value. For example, if Tom is the first user to list Waxahachie, Tex. as his location, server 16 may perform an automated internet search for Waxahachie, focusing specifically on attributes such as its distance to major cities and positive adjectives.

In an example, automatically-generated essay may be based on forms, templates, style sheets, or other content generation schemes. An example form may include, where "[ ]" indicate an optional field to be included if specified or appropriate:

I am a <age>-year-old [<faith>] <gender> living in <adjective> <location> [(near <major_city>)]. I'm <relationship_status>, and looking for a <target_gender>[to <relationship_goal>]. I love <activity_general> [, especially <activity_specific>]. [To get out of the house, I enjoy <activity_out[array]>.] [I share my <home_type> with <pets>.]

In some cases, and particularly in the case of a dating service, safety concerns may arise from detailed profile disclosures. For example, if server 16 displays all information concerning user 13 collected from user profile 2330*a*, a second user may be able to use the information to locate user 13 on third-party service 2320a. If user profile 2330a includes a photograph, another user may also use web search tools to match that photograph to user 13.

To obviate safety concerns, certain data may be obfuscated, abstracted, obscured, or otherwise masked. By way of non-limiting example, a profile picture may be puzzlized as described herein, or tilted slightly, for example, by one degree, so that the content is not noticeably disturbed to a human user, but web search algorithms searching for an exact match may be frustrated. Metadata may also be removed from the photograph, including for example, location, time, and tagged individuals. Some third-party services 2320 may also watermark images. Thus, it may be desirable to remove watermarks. In some cases, processing a photograph in this way may be time consuming, in which case it may be beneficial to process the photograph asynchronously with interactive portions of user profile creation so that it does not interfere with the user experience or create a potential barrier to profile creation.

To preserve anonymity in free-form text fields, company names, locations, and names of people may be removed. These may be identified, for example, based on a self-organizing dictionary. Some types of text may also be displayed at a higher level of abstraction. For example, a specific address may be converted simply to "Dallas, Tex.," or "North Texas," or just "Texas." "My cat fluffy" may be converted simply to "cat." Dislikes may also be abstracted. Statements may be rephrased using a thesaurus to identify synonyms or anti-antonyms (double negatives). For example, "I hate cocker spaniels" may be displayed as "I dislike some dogs." First, middle, and last names may be replaced by a user-selected handle. Other typed fields may either not be displayed, or moved to a higher level of abstraction. For example, if user 13's age is 37, it may be displayed as "35-40." In general terms, this process is referred to in this specification as "obfuscating profile data" or "profile data obfuscation."

Figure 25:
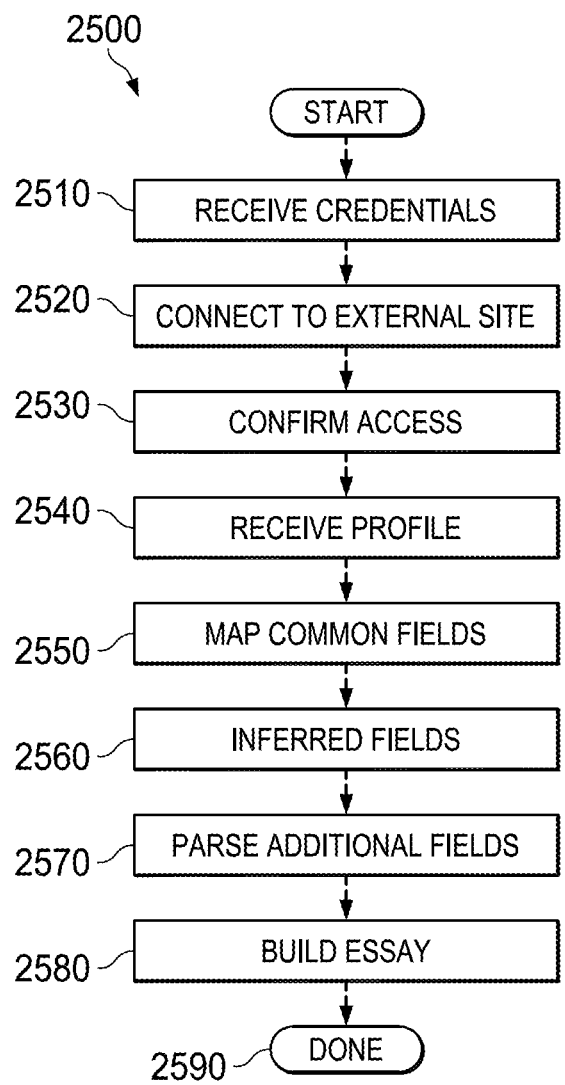
FIG. 25 is a flow diagram of a method of initializing a user profile by way of a third-party service according to one or more example embodiments of the present specification.

FIG. 25 is a flow diagram of a method 2500 for initial creation of a user profile 25 according to one or more example embodiments of the present specification. Method 2500 may be initiated for example when a user attempts to sign up for a matching service with server 16 via website 22 over communication network 14. In this example, server 16 receives credentials from user 12, which credentials may be for logging on to a third-party service 2310. In block 2520, server 16 connects to third-party service 2310 for example via API 2320. In block 2530, user 12 may be asked to confirm that he is granting server 16 access to user third-party user profile 2330, for example via dialog box or similar. Once user 12 has confirmed access, in block 2540, server 16 receives profile data from third-party service 2310, for example via API 2320. In block 2550, common fields are mapped directly to user profile 25. In block 2560, inferred fields are mapped to user profile 25. In block 2570, additional fields are parsed, and may be assigned attributes from attribute database 27. In block 2580, automatically-generated essay 2430 is built. In block 2590, the user is done. In this example, the user was enabled to create a profile simply by logging into third-party service 2310 and confirming access via a dialog box, thus providing a relatively easy, two-click profile creation. Advantageously, if user 12 was previously hesitant to join because he did not want to invest the effort into creating a new profile, he may be willing to join with a simplified two-click profile creation method.

Advantageously, user 12 may not need to create a new login with new credentials for server 16. Rather, he may be enabled to permanently use credentials for a third-party service 2310, thus reducing the number of usernames and passwords user 12 is required to keep track of.

Figure 26:
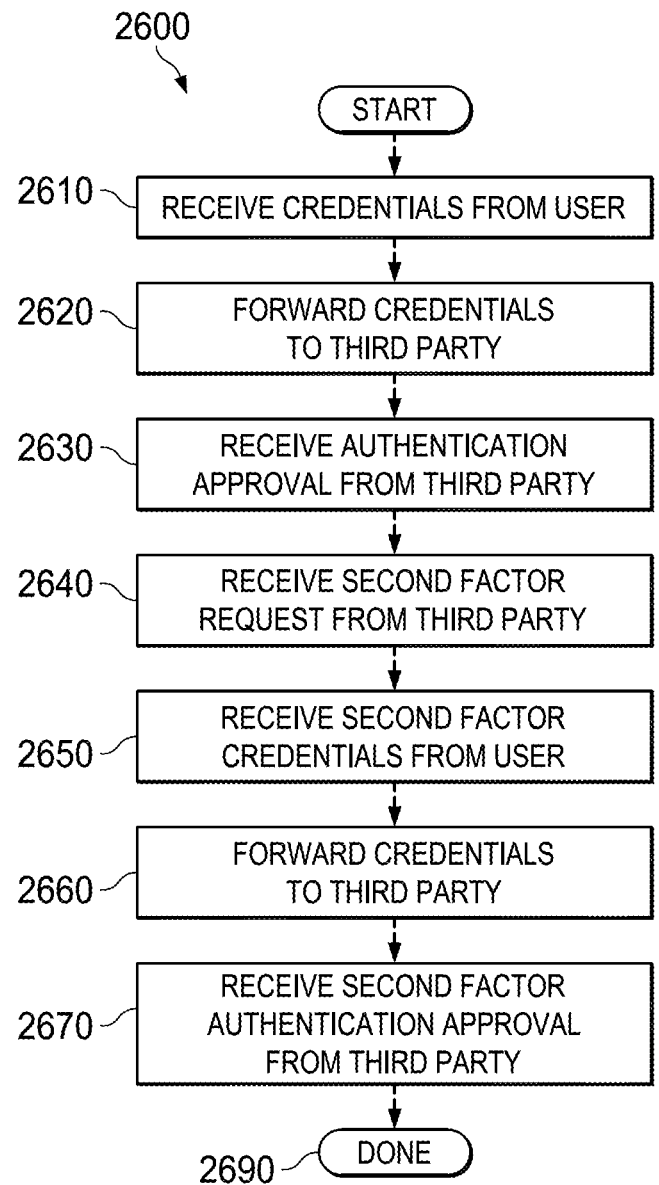
FIG. 26 is a flow diagram of a method of authenticating a user via a third-party service according to one or more example embodiments of the present specification.

FIG. 26 is a flow diagram of an example two-factor user authentication scheme 2600 for logging into server 16 via credentials for third-party service 2310. It should be noted that although two-factor authentication is disclosed herein by way of example, other schemes are possible. For example, single-factor authentication (e.g., simply entering a username and password) may be provided, or three-or-more factor authentication may be provided for increased security. In the example method, in block 2610, server 16 receives credentials, such as a username and password, from user 12. In block 2620, these credentials may be forwarded to third-party service 2310, which may involve a secure communication protocol such as HTTPS. In block 2630, third-party service 2310 sends an authentication approval, indicating that the user correctly supplied a matching username and password.

In a single-factor authentication scheme, the user is now completely authenticated. However, a two-factor scheme requires additional steps. In this case, once the user has passed a first authentication factor, a second factor may be required. For example, a text message with a one-time code may be sent to a cell phone the user holds, or a one-time RSA secure certificate may be sent to the user's mobile device. It should be noted that many other types of second-factor authentication may be used, including biometric data, use of a secure token, use of a permanent certificate, user of an RFID device, or similar. In the case where the second factor is provided as a one-time code texted to user 12, a dialog box is provided asking the user to enter the one-time code sent to his cell phone. In block 2650, server 16 receives the one-time code or other second authorization factor from user 12. In block 2660, the second token is forwarded to third-party service 2310. In block 2670, if the second factor is correctly received, then second factor authentication approval is received, and in block 2690, the user is done authenticating. Note that in some two-factor authentication schemes, the second factor is required only on the first time a user logs in via a new device or computer. Once that login is complete, the user may be given an option to "remember" that device, so that single-factor authentication can be used from that device in the future.

Although the present disclosure has been described in detail with reference to particular embodiments, it should be understood that various other changes, substitutions, and alterations may be made hereto without departing from the spirit and scope of the present disclosure. For example, although the present disclosure has been described with reference to a dating protocol, any service that deals with (or that leverages) profiles, photos, resumes, user information more generally, etc. could readily benefit from the present disclosure.

Moreover, although the present disclosure has been described with reference to a number of elements included within system 10, these elements may be rearranged or positioned in any appropriate manner to accommodate any suitable networking configurations. In addition, any of the elements of FIG. 1 may be provided as separate external components to system 10 or to each other where appropriate.

Furthermore, where there are procedures, methods, or processes described, it is important to note that the ordering of steps is disclosed by way of example only, and that any step may occur before, after, or contemporaneously with any other step except where it is expressly stated that one step must precede another, or where circumstances dictate such an arrangement. Where a particular sequence or order is required, it is not intended to dictate that one step must directly or immediately follow another, that one must be a direct, proximate cause of the other, or that other intervening steps cannot occur. Many steps may also be taken asynchronously from other steps, or in parallel therewith. The example procedures, methods, and processes may also be performed by more than one person, entity, device, computer, or enterprise without departing from the spirit and scope of this specification.

It should also be noted that any of the question portions of the platform can leverage any type of format. Thus, in any aspect of the online dating process described herein, such as establishing a personality profile, for example, any suitable question format can be employed. Example formats include a Yes/No format, a multiple choice question format, a short answer format, a true/false format, etc. Other formats can readily be used in order to achieve the desired responses and solicit the necessary data.

Note that in certain example implementations, the matching and BDR functions outlined herein, such as those carried out by web server 16 and/or website 22 and/or provided as an application for an endpoint being operated by an end user (e.g., a mobile application for an iPhone™), may be implemented by logic encoded in one or more non-transitory, tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory, as shown in FIG. 1, can store data used for the operations described herein. This includes the memory being able to store software, logic, code, or processor instructions that are executed to carry out the activities described in this Specification.

A processor can execute any type of instructions associated with the data to achieve the operations detailed herein in this Specification. In one example, the processor, as shown in FIG. 1, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

These devices illustrated herein may maintain information in any suitable memory (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that with the example provided above, as well as numerous other examples provided herein, interaction may be described in terms of more than one network element. However, this has been done for purposes of clarity and example only. In certain cases, it may be easier to describe one or more of the functionalities of a given set of flows by only referencing a limited number of network elements. It should be appreciated that system 10 (and its teachings) are readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the steps in the preceding flow diagrams illustrate only some of the possible signaling scenarios and patterns that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure. Although the present disclosure has been described in detail with reference to particular arrangements and configurations, these example configurations and arrangements may be changed significantly without departing from the scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving credentials for a third-party service from a node;
   authenticating the node with the third-party service using the credentials;
   receiving profile data from the third-party service; and
   creating a new user profile for the node based on the profile data from the third-party service;
   parsing additional fields in the profile data from the third-party service; and
   mapping the additional fields to the new user profile;
   wherein mapping the additional fields to the new user profile comprises assigning relative weights to the additional fields.

2. The method of claim 1 further comprising mapping common fields from the profile data from the third-party service to the new user profile, and inferring fields for the new user profile from fields in the profile data from the third-party service.

3. The method of claim 1, wherein authenticating the node comprises assigning the node a profile score, and inferring that the node is legitimate if the profile score is above a threshold.

4. The method of claim 1, wherein assigning relative weights to the additional fields comprises correlating at least one additional field to at least one other additional field and inferring a weight from the correlation.

5. The method of claim 1 further comprising building an automatically-generated essay from at least one of the profile data from the third-party service and the new user profile.

6. The method of claim 1, wherein assigning relative weights to the additional fields comprises correlating common data from a plurality of open-ended data fields.

7. The method of claim 1, wherein assigning relative weights to the additional fields comprises aggregating a plurality of expressed preferences, and inferring a weight for a preference based at least in part on a common trait with another preference.

8. A non-transitory tangible computer-readable medium having stored thereon instructions operable to instruct a processor to:
   receive credentials for a third-party service from a node;
   authenticate the node with the third-party service using the credentials;
   receive profile data from the third-party service; and
   create a new user profile for the node based on the profile data from the third-party service
   parse additional fields in the profile data from the third-party service; and
   map the additional fields to the new user profile;
   wherein mapping the additional fields to the new user profile comprises assigning relative weights to the additional fields.

9. The computer-readable medium of claim 8, wherein the instructions are further operable to map common fields from the profile data from the third-party service to the new user profile, and infer fields for the new user profile from fields in the profile data from the third-party service.

10. The computer-readable medium of claim 8, assigning the node a profile score, and inferring that the node is legitimate if the profile score is above a threshold.

11. The computer-readable medium of claim 8, wherein assigning relative weights to the additional fields comprises correlating at least one additional field to at least one other additional field and inferring a weight from the correlation.

12. The computer-readable medium of claim 8, wherein the instructions are further operable to build an automatically-generated essay from at least one of the profile data from the third-party service and the new user profile.

13. The computer-readable medium of claim 8, wherein assigning relative weights to the additional fields comprises correlating common data from a plurality of open-ended data fields.

14. The computer-readable medium of claim 8, wherein assigning relative weights to the additional fields comprises aggregating a plurality of expressed preferences, and inferring a weight for a preference based at least in part on a common trait with another preference.

15. A server comprising:
   a processor, a memory, and a network connection, wherein the server is configured to:
   receive credentials for a third-party service from a node;
   authenticate the node with the third-party service using the credentials;
   receive profile data from the third-party service;
   create a new user profile for the node based on the profile data from the third-party service;
   parse additional fields in the profile data from the third-party service; and
   map the additional fields to the new user profile;
   wherein mapping the additional fields to the new user profile comprises assigning relative weights to the additional fields.

16. The server of claim 15, wherein the server is further configured to map common fields from the profile data from the third-party service to the new user profile, and infer fields for the new user profile from fields in the profile data from the third-party service.

17. The server of claim 15, assigning the node a profile score, and inferring that the node is legitimate if the profile score is above a threshold.

18. The server of claim 15, wherein assigning relative weights to the additional fields comprises correlating at least one additional field to at least one other additional field and inferring a weight from the correlation.

19. The server of claim 15, wherein the server is further configured to build an automatically-generated essay from at least one of the profile data from the third-party service and the new user profile.

20. The server of claim 15, wherein assigning relative weights to the additional fields comprises correlating common data from a plurality of open-ended data fields.

21. The server of claim 15, wherein assigning relative weights to the additional fields comprises aggregating a plurality of expressed preferences, and inferring a weight for a preference based at least in part on a common trait with another preference.

* * * * *